United States Patent
Brazeau

(10) Patent No.: US 10,364,099 B1
(45) Date of Patent: Jul. 30, 2019

(54) INVENTORY SYSTEM WITH VERTICALLY MOBILE DRIVE UNITS AND MOVABLE PANELS

(71) Applicant: Amazon Technologies, Inc., Seattle, WA (US)

(72) Inventor: Jeremiah David Brazeau, Hudson, NH (US)

(73) Assignee: Amazon Technologies, Inc., Seattle, WA (US)

( * ) Notice: Subject to any disclaimer, the term of this patent is extended or adjusted under 35 U.S.C. 154(b) by 148 days.

(21) Appl. No.: 15/474,990

(22) Filed: Mar. 30, 2017

(51) Int. Cl.
| | |
|---|---|
| *B65G 1/04* | (2006.01) |
| *B65G 1/06* | (2006.01) |
| *B65G 1/10* | (2006.01) |
| *B65G 1/137* | (2006.01) |
| *G05D 1/02* | (2006.01) |

(52) U.S. Cl.
CPC ............. *B65G 1/0492* (2013.01); *B65G 1/06* (2013.01); *B65G 1/10* (2013.01); *B65G 1/1373* (2013.01); *G05D 1/0291* (2013.01); *G05D 2201/0216* (2013.01)

(58) Field of Classification Search
CPC ................................ B65G 1/0492; B66F 7/24
See application file for complete search history.

(56) References Cited

U.S. PATENT DOCUMENTS

| | | | |
|---|---|---|---|
| 3,664,523 A | 5/1972 | Carl et al. | |
| 4,324,317 A | 4/1982 | Winkelblech | |
| 8,280,547 B2 | 10/2012 | D'Andrea et al. | |
| 8,721,251 B1 | 5/2014 | Razumov | |
| 9,063,538 B2 | 6/2015 | Yagawa | |
| 9,087,314 B2 | 7/2015 | Hoffman et al. | |
| 9,952,589 B1 | 4/2018 | Brazeau | |
| 10,023,434 B2 * | 7/2018 | Brady | B66B 9/02 |
| 2005/0056492 A1 | 3/2005 | Nielsen | |
| 2007/0007082 A1 | 1/2007 | Nielsen | |
| 2015/0178673 A1 | 6/2015 | Penneman | |
| 2016/0129592 A1 | 5/2016 | Saboo et al. | |
| 2016/0145045 A1 * | 5/2016 | Mountz | B65G 1/1378 700/216 |
| 2016/0176638 A1 | 6/2016 | Toebes | |
| 2017/0101272 A1 | 4/2017 | Cherubini et al. | |

(Continued)

OTHER PUBLICATIONS

U.S. Appl. No. 15/474,808, filed Mar. 30, 2017, Titled: Inventory System With Vertically Mobile Drive Units.

(Continued)

*Primary Examiner* — Mark C Hageman
(74) *Attorney, Agent, or Firm* — Kilpatrick Townsend & Stockton LLP

(57) ABSTRACT

Disclosed inventory systems, methods, and devices can be used to retrieve and transport resources from one location to another. Specifically, a vertically mobile drive unit including a vertical element retention mechanism can be controlled by a management component to retrieve a resource, transport the resource from one floor to a different floor in an inventory system, and deposit the resource at a destination. The vertically mobile drive unit can transit vertically along a vertically disposed element in an inventory system, such as a structural pole or column. The vertically mobile drive unit can ascend to or descend from an upper level by passing through an opening made by a movable panel.

23 Claims, 31 Drawing Sheets

(56) References Cited

U.S. PATENT DOCUMENTS

2017/0158430 A1      6/2017  Raizer
2017/0267452 A1*     9/2017  Goren ................... B65G 1/137
2018/0079626 A1*     3/2018  Brady ..................... B66B 9/02
2018/0148259 A1*     5/2018  Gravelle ................ B65G 1/02
2018/0305122 A1*    10/2018  Moulin ................... B65G 1/02

OTHER PUBLICATIONS

U.S. Appl. No. 15/474,852, filed Mar. 30, 2017, Titled: Inventory System With Swiveling Vertically Mobile Drive Units.

* cited by examiner

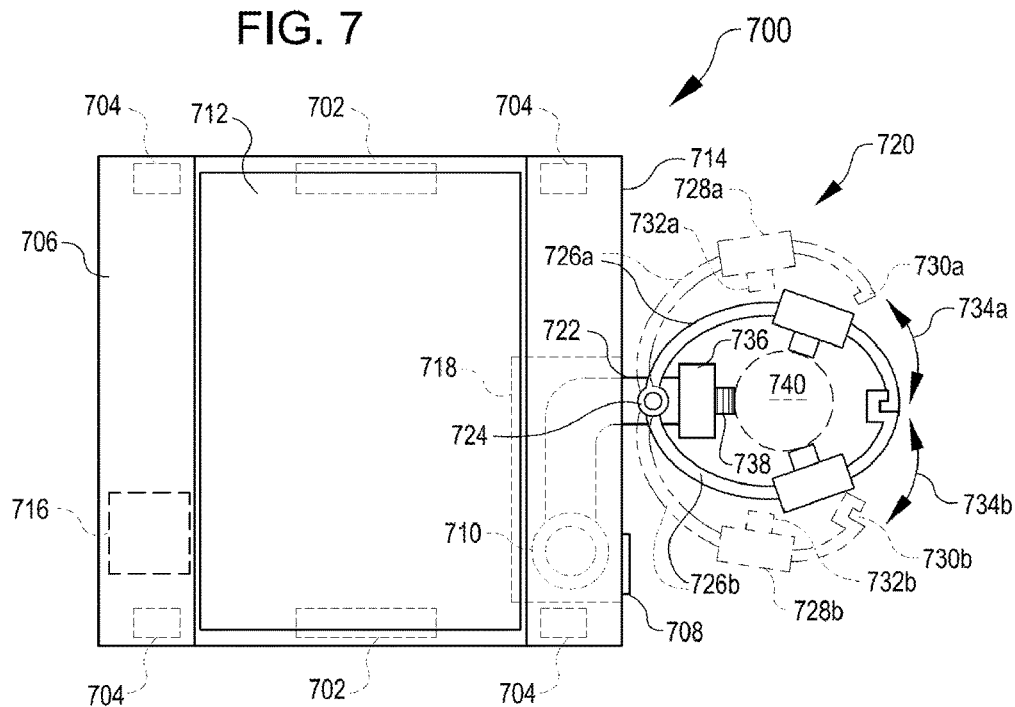
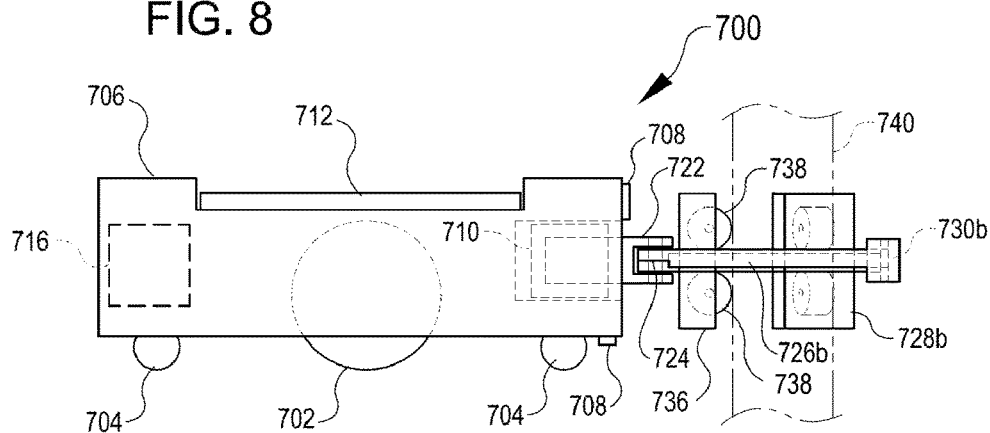

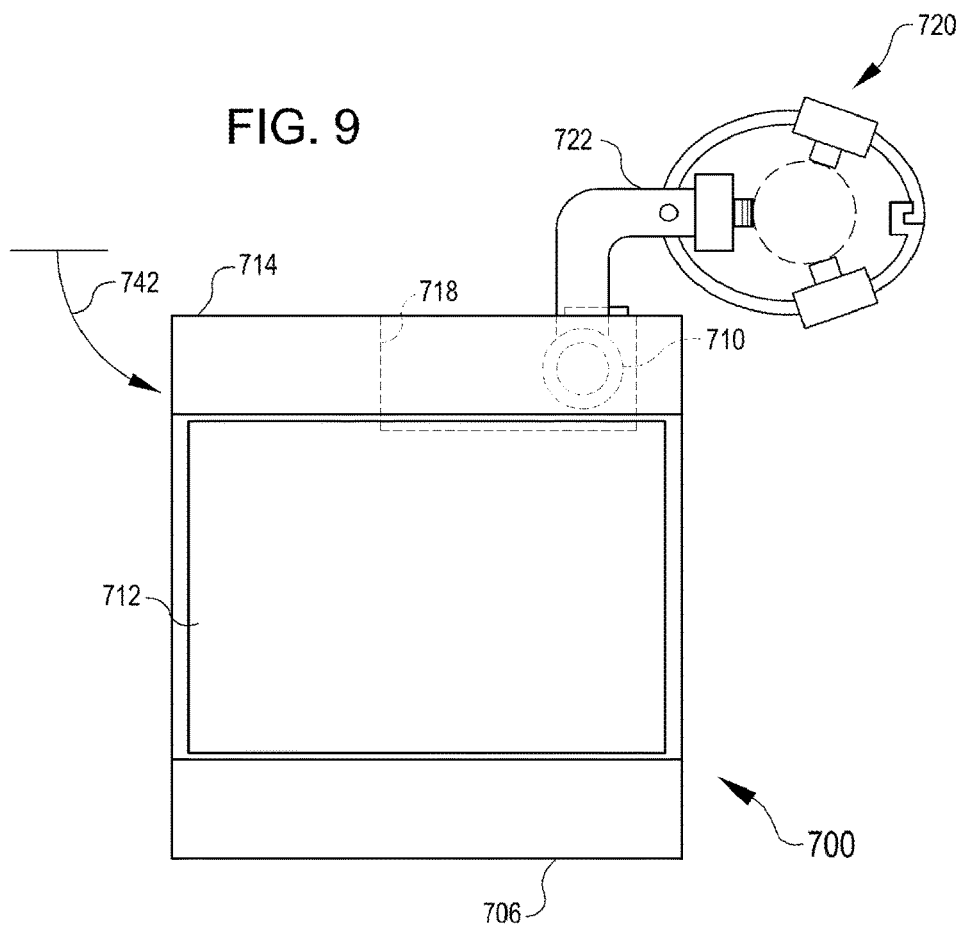

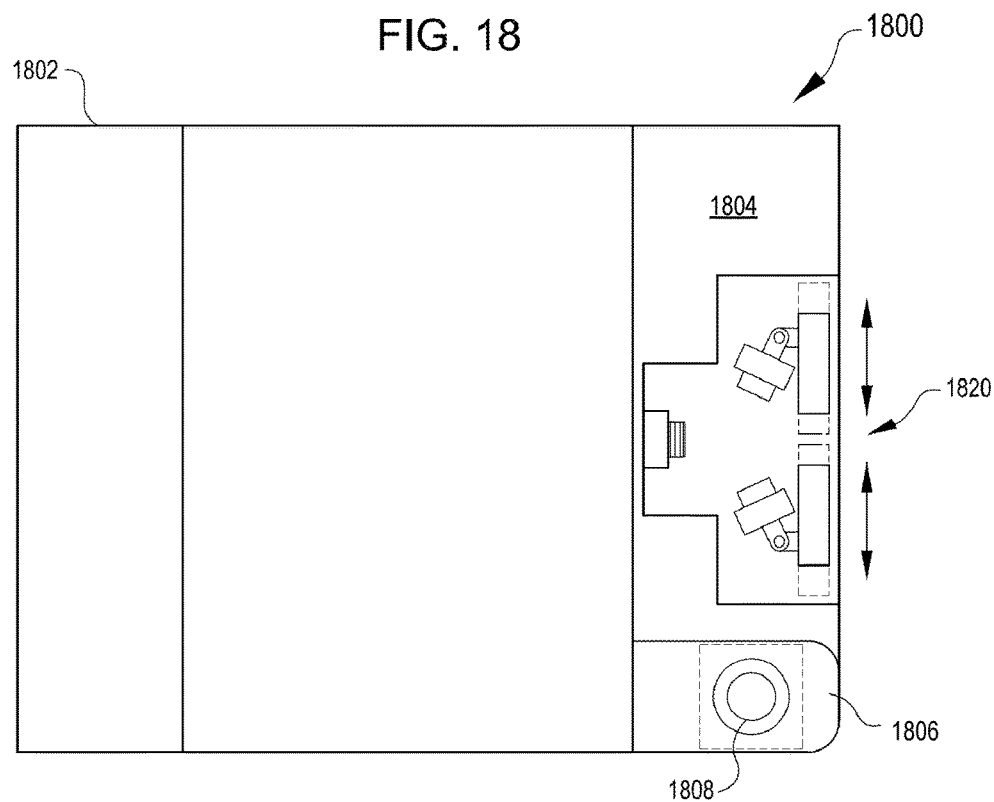

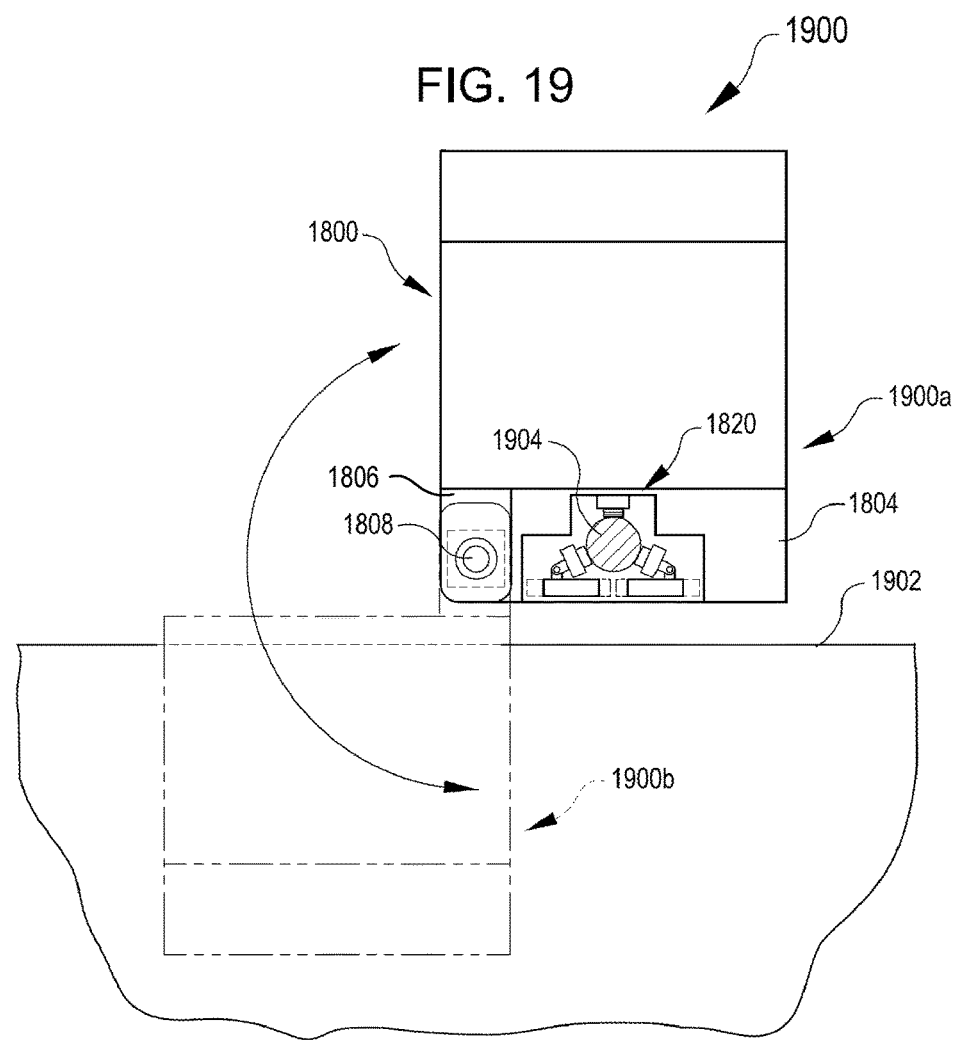

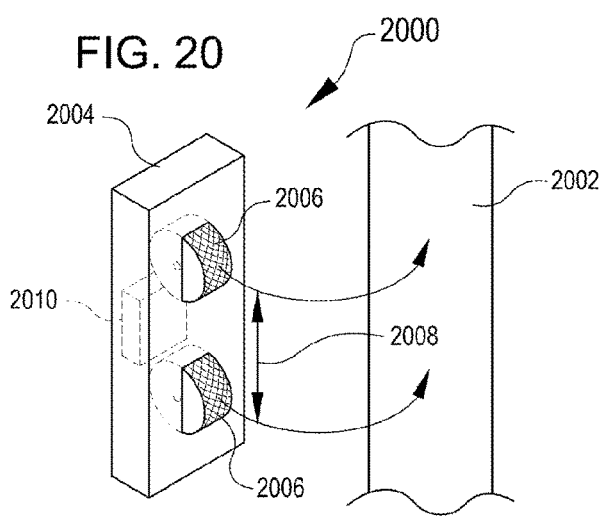
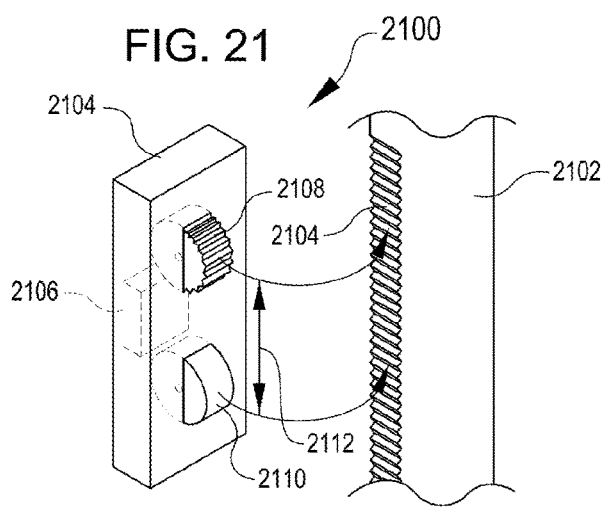
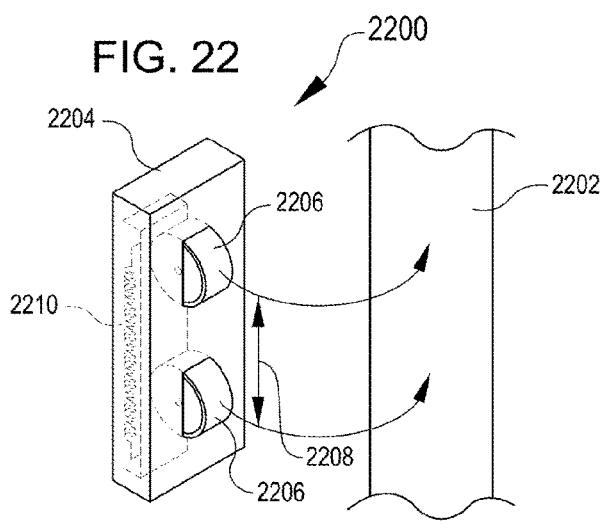

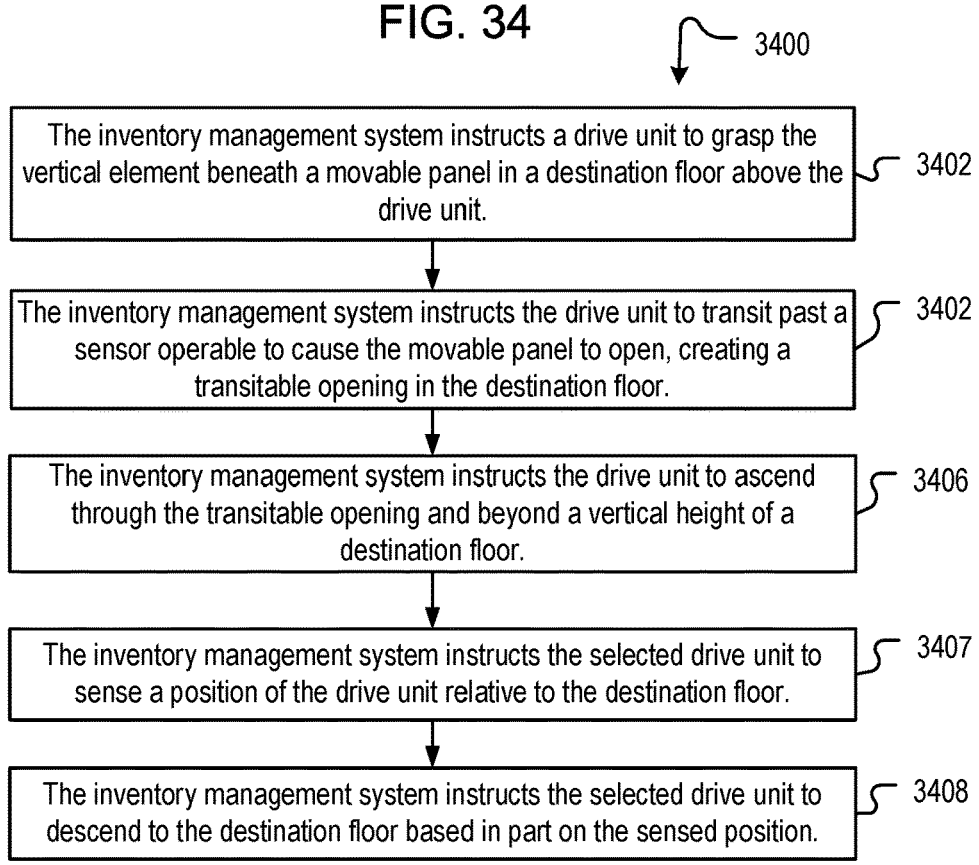
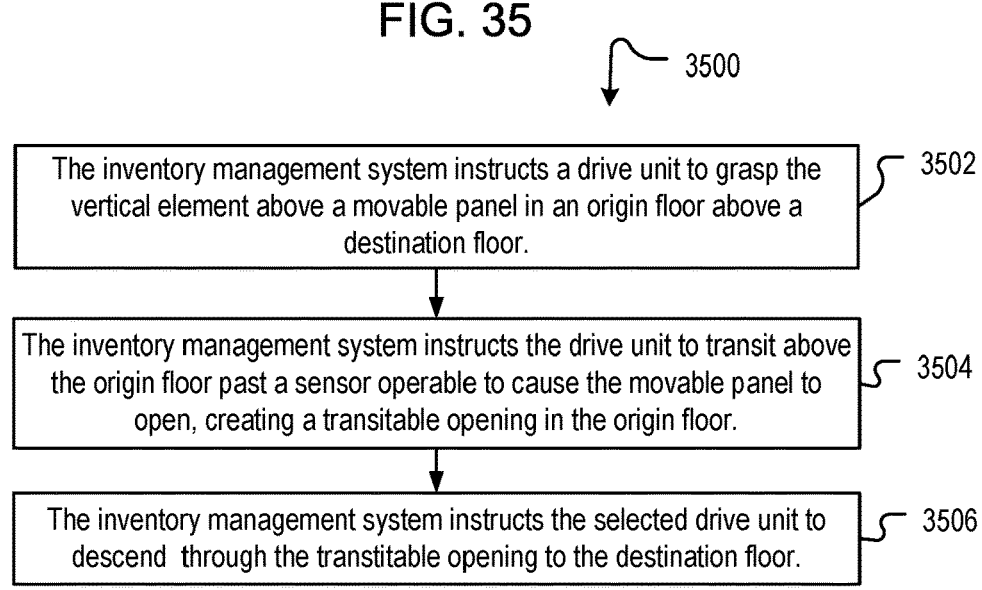

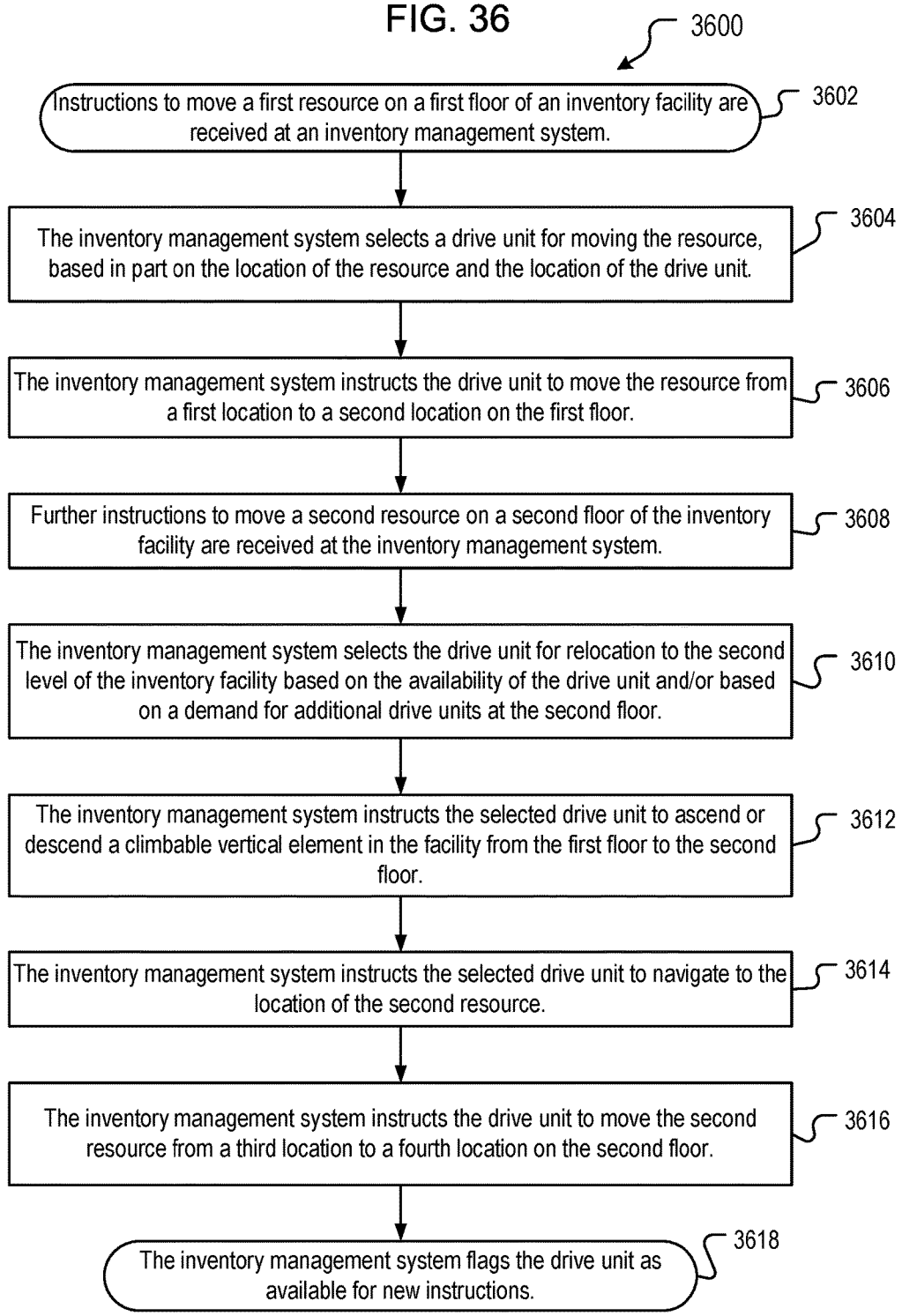

INVENTORY SYSTEM WITH VERTICALLY MOBILE DRIVE UNITS AND MOVABLE PANELS

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance.

Expanding the size or capabilities of many inventory systems requires significant changes to existing infrastructure and equipment. As a result, efforts are made to increase the utilization of space bounded by a finite infrastructure by increasing the density of packing in both horizontal and vertical directions. For example, inventory systems are now occasionally split between ground floors and mezzanine levels within a large structure. However, moving inventory items into or out of densely packed storage areas or multilevel storage areas can be inefficient using existing ground-based units or conventional vertical displacement mechanisms like elevators.

BRIEF DESCRIPTION OF THE DRAWINGS

Various embodiments in accordance with the present disclosure will be described with reference to the drawings, in which:

FIGS. 7-9 show a drive unit with a vertical element grasping mechanism for implementing aspects of an inventory system, in accordance with embodiments;

FIG. 18 shows a third drive unit with an alternative internal vertical element grasping mechanism for implementing aspects of an inventory system, in accordance with embodiments;

FIG. 19 illustrates a sixth mode of moving a drive unit onto an upper level of an inventory management facility;

FIGS. 20-23 show various embodiments of drive elements for a vertical element grasping mechanism, in accordance with embodiments;

FIG. 34 illustrates a second example process for controlling a drive unit to ascend to an upper level of an inventory system via a movable panel;

FIG. 35 illustrates a second example process for controlling a drive unit to descend from an upper level of an inventory system via a movable panel;

FIG. 36 illustrates an example process for controlling a drive unit to reposition the drive unit in an inventory system.

DETAILED DESCRIPTION

Figure 1:
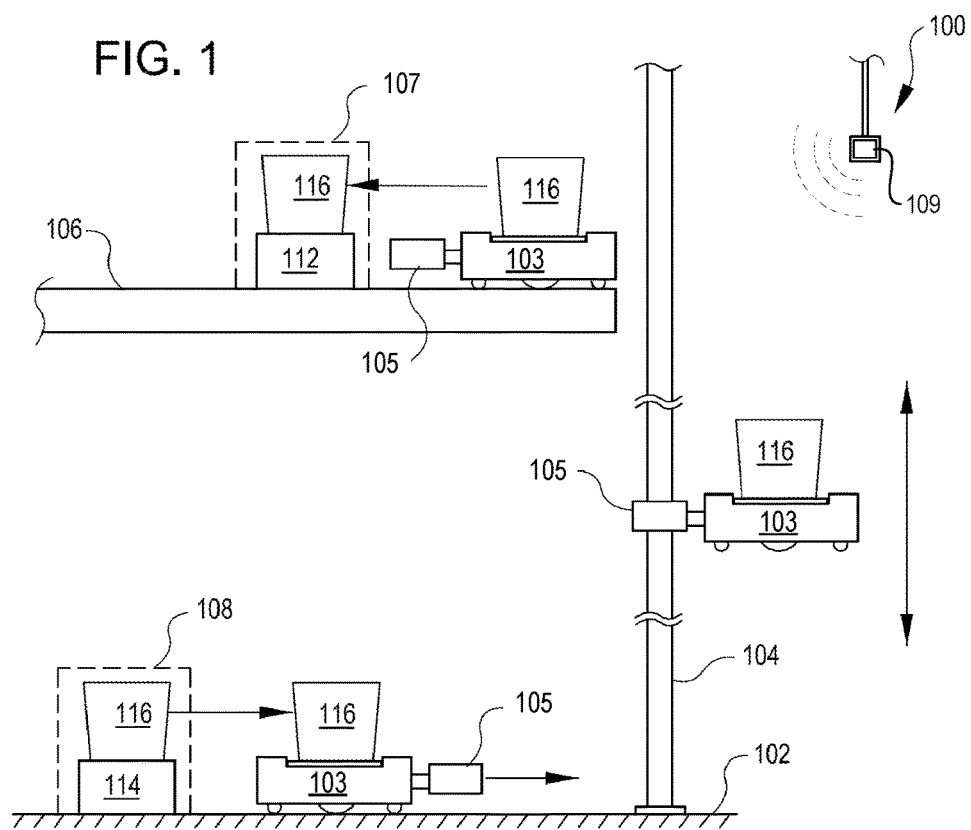
FIG. 1 illustrates an example inventory system in a side view, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having various resources, such as inventory, containers, inventory holders, dunnage, boxes, and the like; and drive units for moving the resources. Specifically, features herein are directed to moving the resources between disparate locations in an inventory management facility according to instructions from an inventory system. Disparate locations in an inventory system may be, for example, different mezzanine levels of a multi-level inventory management facility. To this end, the inventory system may include vertically mobile drive units for assisting in moving resources and/or inventory items between locations at one facility level and another. The inventory system can also possess autonomous ground drive units and other robotics for transporting and processing resources and inventory items.

Vertically mobile drive units as described herein are capable of transiting vertical members within the inventory system. Such drive units are operable to transfer resources between upper and lower levels of the inventory system within an inventory management facility, such as a warehouse, shipping center, or comparable inventory system. Specifically, embodiments are directed to vertically mobile drive units possessing vertical element grasping mechanisms that are operable to grasp vertical elements, such as structural columns, beams, or the like; and to transit upward or downward along the vertical elements. According to various embodiments, the vertically mobile drive units can move to grasp the vertical elements, transit up or down along the vertical elements, and either depart the vertical elements at a different level of the inventory system, or receive or offload a resource at different levels of the inventory system. According to some embodiments, the vertically mobile drive units are autonomous, semi-autonomous, or computer-controlled by way of an inventory management system that directs the drive units to transit throughout the inventory system and transfer resources therein. Embodiments herein are also directed to systems for controlling a vertically mobile drive unit in an inventory system, and specifically to various processes for enabling a vertically mobile drive unit to transit between destination and origin positions in a multi-level inventory system, or to transfer resources between the destination and origin positions.

In alternate embodiments, an inventory system may operate on a single floor, or on any practicable number of floors including multiple mezzanine floors. For example, in some embodiments, an inventory system may operate on a ground floor and on two, three, four, or more than four mezzanine floors. In some other embodiments, a ground floor may be used for non-storage purposes, such that an inventory system operates on one, two, three, four, or more mezzanine floors and may optionally ferry items or containers to the ground floor As used herein, "resource" can include any suitable object or container to be moved within an inventory system, e.g., items of inventory, containers, packaging material, or the like. In some cases, "resource" can include any item within an inventory system that is within a weight limit of a vertically mobile drive unit. In certain cases, "resource" can include even heavy items, in some cases including inventory-containing totes, or in some cases including inventory holders (see FIG. 6).

By way of example, suppose that an inventory system has two levels including a ground floor and a mezzanine. A resource (e.g., empty containers for sorting or transporting inventory) is depleted on the mezzanine, and a surplus of the containers is available on the ground floor. An inventory management system can receive a request to transfer the surplus containers from the ground floor to the mezzanine, and dispatch a vertically mobile drive unit to the location of the surplus resource (the origin). Once retrieved, the drive unit can transport its payload from the origin to a vertical element in the inventory system (e.g., a vertical pole or column that passes near or passes through the mezzanine), where the drive unit can grip the vertical element, climb vertically along the vertical element until above the mezzanine, and then depart the vertical element to transit on the mezzanine level. The vertically mobile drive unit can then transfer the surplus containers to the location of the depleted resource (the destination). By transiting up to the mezzanine along a vertical element in the inventory system, the vertically mobile drive unit avoids adding traffic to any of the conventional vertical movers (e.g. elevators or the like) in the inventory system, thus improving overall efficiency of the inventory system.

FIG. 1 shows one such example system 100, in which a vertically mobile drive unit 103 is shown transferring a resource 116 from a ground floor 102 to a mezzanine 106, in accordance with embodiments. The drive unit 103 is shown in various stages of transferring the resource 116 including, receiving the resource from an origin element 614 at an origin position 608, transiting vertically along a vertical element 604 that runs adjacent to the mezzanine 106, and depositing the resource to a destination element 612 at a destination position 107. The vertically mobile drive unit 103 has a vertical element grasping mechanism 105 which is operable to securely grip the vertical element 604, and to provide sufficient vertical force to cause the drive unit to traverse up and down the vertical element. The vertical element grasping mechanism 105 is also operable to transit the drive unit 103 around the vertical element 104 when the drive unit has passed above the level of the mezzanine 106 in order to place the drive unit on top of the mezzanine such that it can release the vertical element and transit to the destination location 107. According to some embodiments, the vertically mobile drive unit 103 may be autonomous or semiautonomous, and receive instructions to transfer the resource 116 by way of an inventory system management element 109; however, in some cases, the drive unit 103 may be operated directly under the control of the inventory system management element 109. Generally, vertically mobile drive units 103 are operable to also navigate horizontally on a ground floor 102 or mezzanine 106, and can attach to and detach from a vertical member 104 as needed to transit between floors.

Aspects of vertical element grasping mechanisms, systems, and methods for transiting between different levels of an inventory system are discussed below in greater detail with reference to FIGS. 7-35. Vertically mobile drive units 103 as described herein, in addition to having the capability of transiting between floors along vertical elements, are operable to transit horizontally along those floors. Inventory systems, as well as systems and methods for transiting along the floor and for transporting items thereby, are discussed below in greater detail with reference to FIGS. 2-6.

Figure 2:
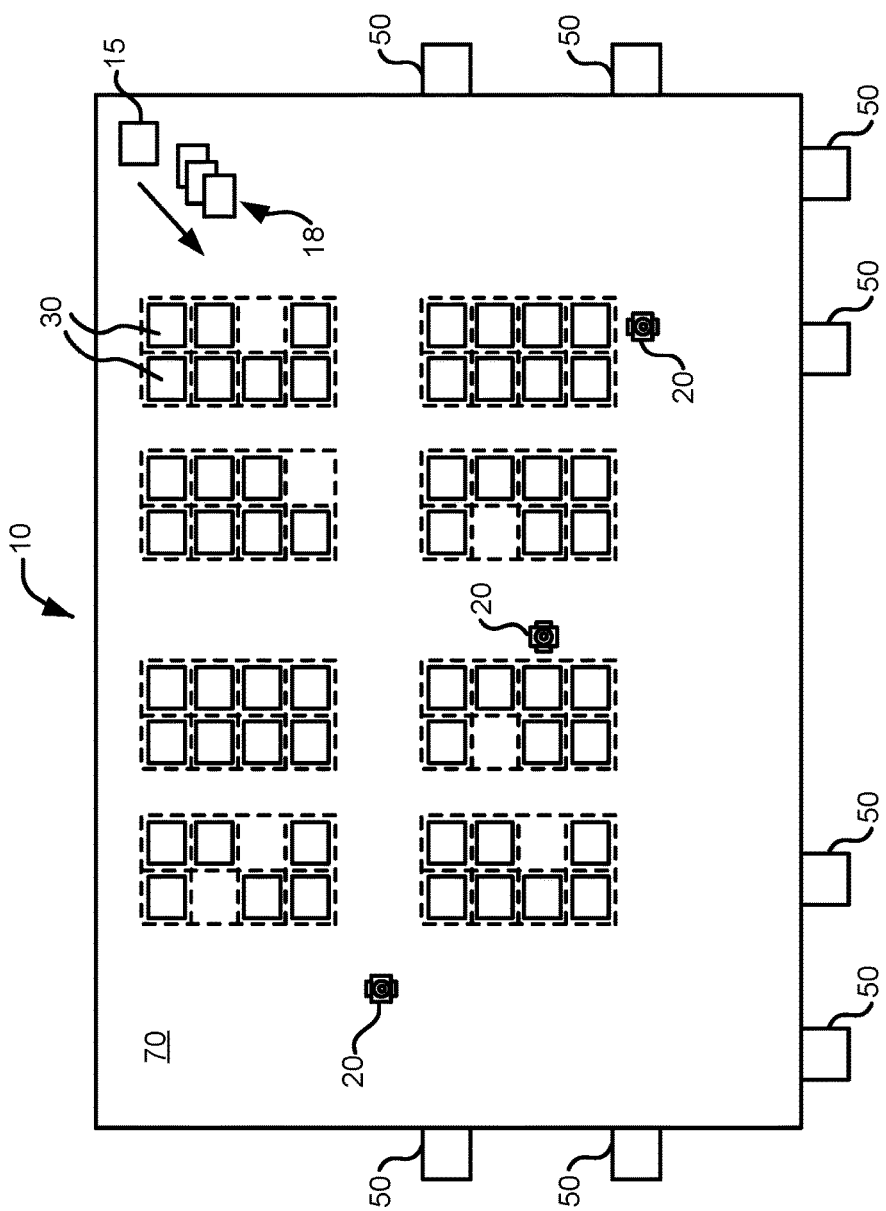
FIG. 2 illustrates components of an inventory system according to a particular embodiment.

FIG. 2 illustrates the components of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items or other resources.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The components and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
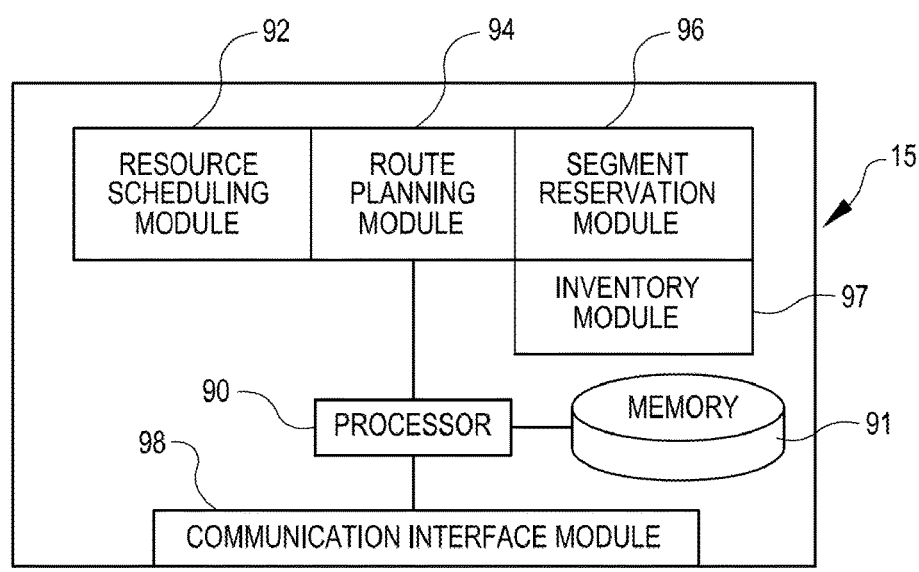
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
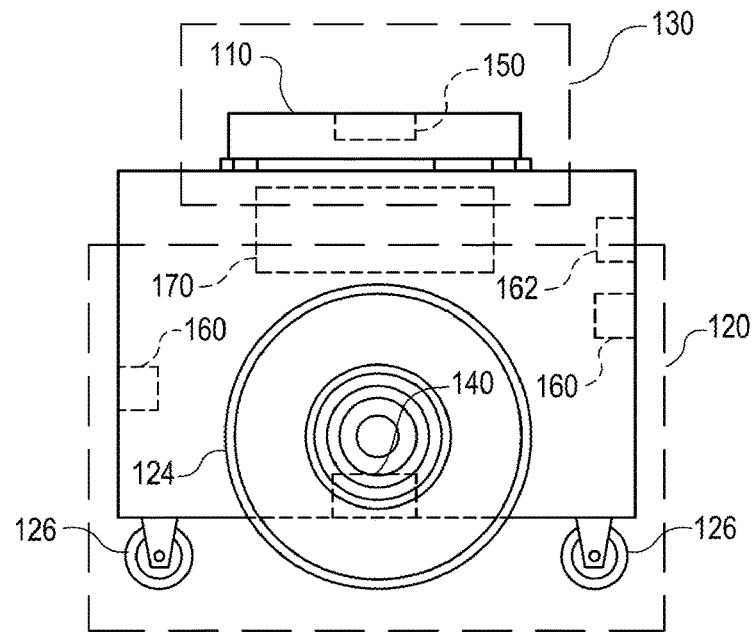
FIGS. 4 and 5 illustrate in greater detail an example mobile drive unit that may be utilized in particular embodiments of the inventory system shown in FIG. 2.
Figure 5:
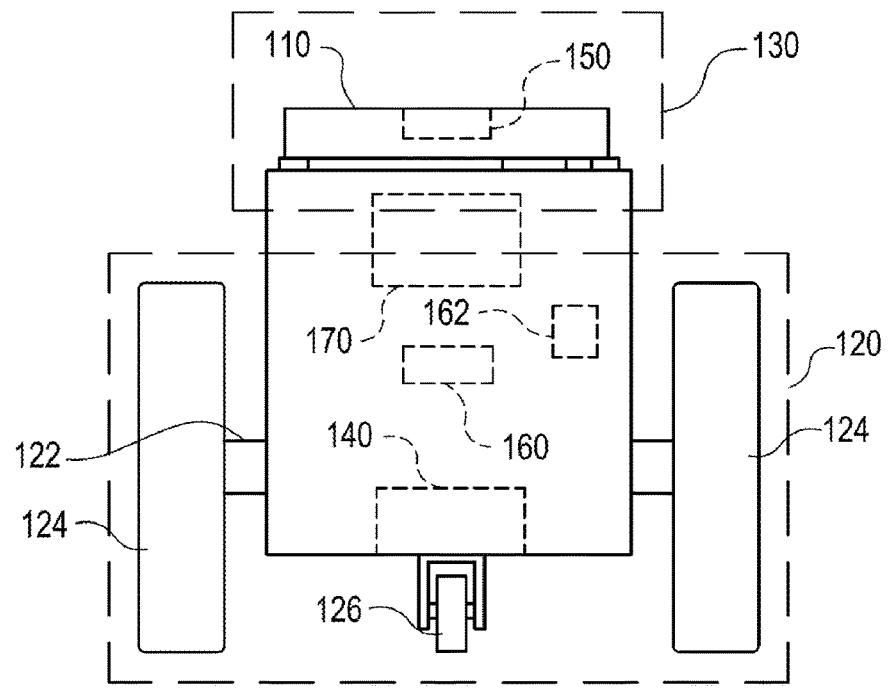

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to self-propel. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
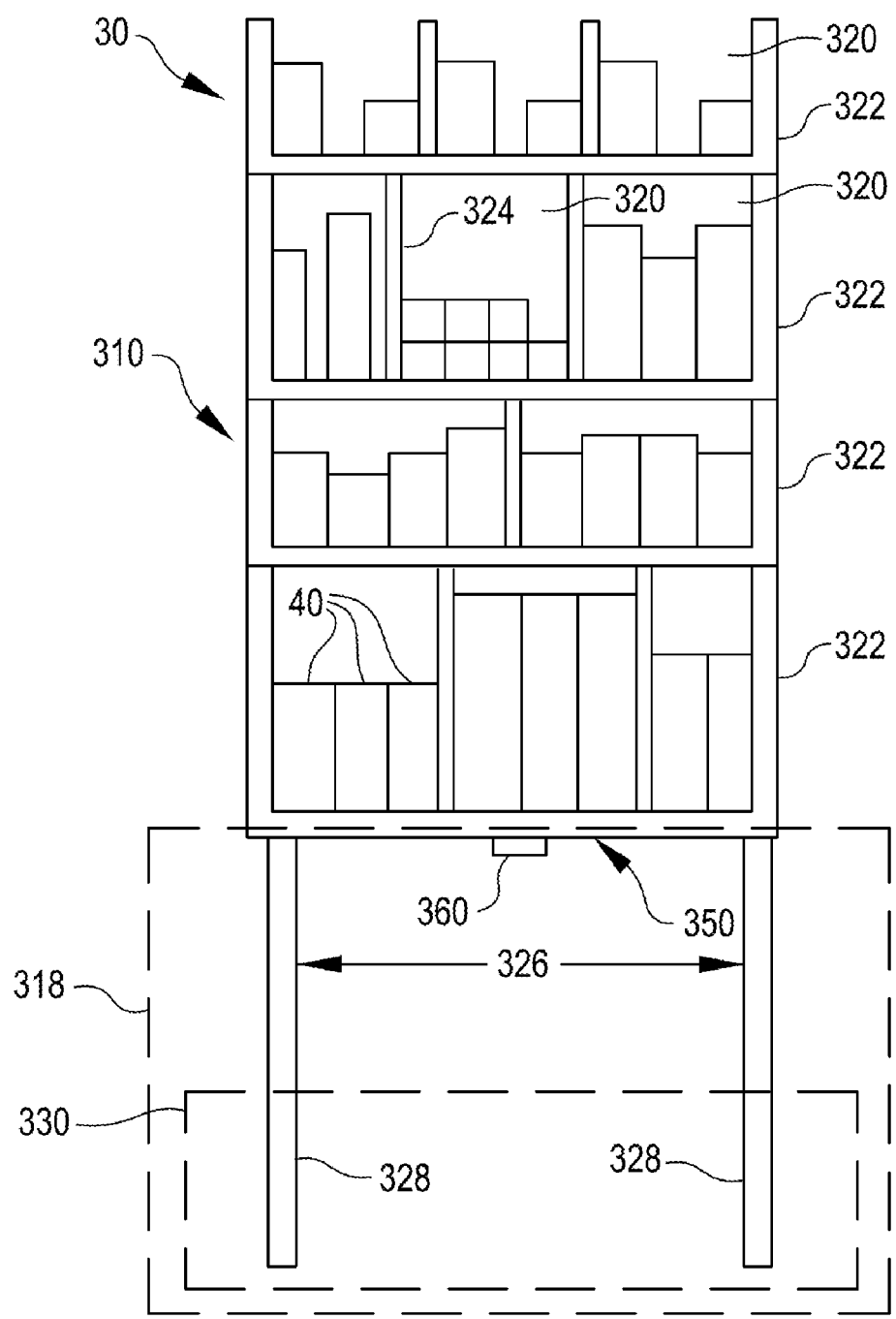
FIG. 6 illustrates in greater detail an example inventory holder that may be utilized in particular embodiments of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

As described above, embodiments herein are directed to systems for moving resources and/or inventory within an inventory system using mobile drive units. In particular, apparatuses, systems, and methods discussed herein are directed to moving resources and/or inventory within the inventory system by employing vertically mobile drive units capable of ascending or descending vertical elements within an inventory management facility, as described above with reference to the system 100 shown in FIG. 1. Mobile drive units and inventory may be used in conjunction with systems such as system 100 for transferring inventory or other resources to and from vertically mobile drive units. In addition, vertically mobile drive units and systems for controlling vertically mobile drive units may possess any features or combination of features as disclosed above with reference to mobile drive units and systems shown in FIGS. 2-5. In some cases, vertically mobile drive units may be operable to transport inventory holders such as the inventory holder 30 as described with reference to FIG. 6. According to some embodiments, this capability may extend to vertically transporting inventory holders.

FIG. 7 show a vertically mobile drive unit 700 with a vertical element grasping mechanism 720 for implementing aspects of an inventory system, such as system 100 shown in FIG. 1, in accordance with embodiments. FIG. 7 illustrates the example drive unit 700 in a top-down view, showing with particularity aspects of a vertical element grasping mechanism 720. The drive unit 700 includes a body 706 which has several features in common with mobile drive units as discussed above with reference to FIGS. 2-5. The drive unit 700 includes a horizontal drive mechanism including, e.g., drive wheels 702 and stabilizing wheels 704 positioned to support the drive unit and provide for horizontal displacement on the ground. The drive unit 700 also includes resource retention elements, such as a resource platform 712, which can further include features for onloading or offloading a resource. As shown, the resource platform 712 defines a conveyor; however it will be understood that the resource platform 712 can be replaced with a robotic platform, robotic arm, or the like, without deviating from the spirit of this disclosure. The body 706 also contains a control element 716 which can contain onboard processing, memory, and networking modules for enabling the operation of the drive unit 700 and the integration of the drive unit into an inventory system. Also shown is are sensors 708 configured to detect or determine the location of the drive unit 700 and/or other appropriate elements of an inventory system.

According to some embodiments, the vertically mobile drive unit can include retention elements in addition to or in place of the resource platform 712. For example, in some embodiments, the drive unit 700 can include any suitable features of the mobile drive units 20. Specifically, embodiments include vertically mobile drive units having features for docking with inventory holders 30 (see FIGS. 2-5), e.g. docking mechanisms such as docking head 110 and docking actuator 130 shown in FIGS. 4-5 for interfacing with inventory holders like inventory holder 30 as shown in FIGS. 2 and 6. Vertically mobile drive units can also include further sensors for detecting a payload, similar to holder sensors 150 for detecting inventory holder 30 or other payload. In some cases, vertically mobile drive units can include retaining features having multiple functionalities, including capabilities of transporting lightweight materials such as totes, boxes, or other resources, and heavier cargo such as inventory holders.

The vertical element grasping mechanism 720 is connected with the drive unit 700 at a grasping end 714. The grasping mechanism 720 includes a drive mechanism including at least one drive element 736 with at least one driving contact element 738. Two grasping arms 726a,b extend from a pivoting connection 722 so as to surround a vertical element 740 and bring the driving contact element 738 into contact with the vertical element. Gripping elements 728a,b also containing contact elements 732a,b, are connected with the grasping arms 726a,b, so that they come into contact with the vertical element 740. The grasping arms 726a,b can be locked together when fully surrounding the vertical element 740 by, e.g., locking features 730a,b. Suitable locking features can operate by way of forming a mechanical connection, by hydraulic force, by magnetic force, or any other suitable locking means. The grasping arms 726a,b can open and close by predetermined ranges of motion 734a,b which are at least sufficient to allow the grasping mechanism 720 to encompass and grasp a vertical element in an inventory system.

The grasping mechanism 720 is connected with the body 706 of the drive unit 700. In accordance with some embodiments, the grasping mechanism 720 is positioned at an end of a mechanical arm 722 which can connect with the body 706 of the drive unit 700 at a pivoting actuator 710. In some embodiments, the mechanical arm 722 can rest inside a cavity 718 of the drive unit 700 during ordinary operation, while capable of swinging outward to maneuver the drive unit when the drive unit is suspended by the grasping mechanism. By resting within the cavity, 718, the mechanical arm 722 can reduce the overall moment exerted by the drive unit 700 on the vertical element 740 when the drive unit is suspended along the vertical element.

FIG. 8 shows the vertically mobile drive unit 700 in a side view. As shown, the drive unit 700 is capable to mechanically grasping a vertical element 740 (shown here as a vertical pole) with grasping arms 726a,b of the grasping mechanism 720. The gripping elements 728a,b have sufficient height to employ at least two vertically separated contact elements 738. The contact elements 738 can be rollers, sliders, geared rollers, rollers with an adhesive, tacky, or gripping surface, or other comparable material or structure for firmly securing the vertical element 740 by the grasping mechanism 720, and for supporting the weight of the drive unit 700, along with any resource or cargo on the drive unit, while the drive unit is ascending or descending the vertical element. Also shown, the sensors 708 can include multiple sensors disposed at different positions around the drive unit 700, e.g., at the grasping end 714 where the sensors may be operable to locate a vertical element to enable grasping; underneath the drive unit where the sensors may be operable to locate markings or other navigation aids along a floor of an inventory system; or at various other positions for sensing an environment around the drive unit.

According to some embodiments, sensors 708 can detect a vertical position of the drive unit 700, e.g. by sensing the proximity of a floor of an inventory facility (e.g., visual, radar, laser, altitude sensors, or comparable sensors can be used to determine a position of proximate objects such as the ground floor beneath the drive unit, or a mezzanine level of a facility adjacent to, above, or below the drive unit). Visual, radar, laser, or comparable sensors can also be configured to detect location indicia positioned in the environment, such as markings, machine-readable codes, or colors placed in an inventory facility to denote locations, heights, and relative positions of features such as the levels in the inventory facility. Such markings may or may not be in human-visible spectra. In some embodiments, sensors 708 can include electronics configured to detect a proximity signal, e.g. by RFID or comparable sensors, to interact with location beacons or similar transmitters positioned throughout parts of an inventory facility, such as embedded in the ground and/or mezzanine levels of a multi-level inventory facility, or positioned in or on the vertical elements. In some embodiments, sensors 708 include sensors in the grasping end 714 or grasping mechanism 720 for detecting the distance of travel of the drive unit 700, e.g. by tracking and storing information on vertical travelled distance.

FIG. 9 shows the vertically mobile drive unit 700 in a top view with the mechanical arm 722 extended, such that the body 706 of the mobile drive unit is both rotated with respect to its initial position, and around the vertical element 740. The drive unit 700 is shown rotated about an arc 742 which, in some cases, may be about 90 degrees. In various other embodiments, the mechanical arm may provide for rotating the drive unit 700 around any suitable path, which may vary from 0 to about 180 degrees, from 45 to 135 degrees, or from 60 to about 120 degrees. In this extended configuration, the body 706 of the drive unit 700 is also generally farther from the vertical element 740 than in the close configuration show in FIGS. 7-8. Thus, both the rotation of the drive unit 700, and the extension of the drive unit away from the vertical element 740, can be employed to position the drive unit 700 above a floor, level, or platform of an inventory management facility in an inventory system. In some alternative embodiments, the mechanical arm 722 may also extend, so that the drive unit 700 can be further displaced horizontally relative to the vertical element 740.

It will be understood that the features of the vertically mobile drive unit 700 shown in FIGS. 7-9 may be combined with suitable features of the subsequent drive units described below. For example, various configurations of a drive unit body (e.g. body 706) may be combined with any suitable grasping mechanism, mechanical arm, grasping elements, or the like. Variations of a drive unit employing different combinations of the drive unit bodies, mechanical arms, and grasping mechanisms are within the scope of this disclosure, except where expressly provided otherwise. A grasping mechanism, such as grasping mechanism 720, may possess as few as two gripping elements (e.g., gripping elements 728*a*, 728*b*) or may have a greater number of gripping elements. Preferably, drive elements (e.g. drive element 736) and gripping elements (e.g., gripping elements 728*a,b*) will provide for points of contact around a vertical element from at least three directions, but in various alternative embodiments, a grasping mechanism may have additional drive elements and/or gripping elements spaced to grasp the vertical element from more than three directions. Drive and gripping elements are preferably spaced evenly for interacting with a symmetrical (i.e., circular, square, or rectangular) vertical element; but may be provided according to an element-specific geometry to interact with vertical elements of complex shapes (e.g., I-beams or comparable structural shapes).

Figure 10:
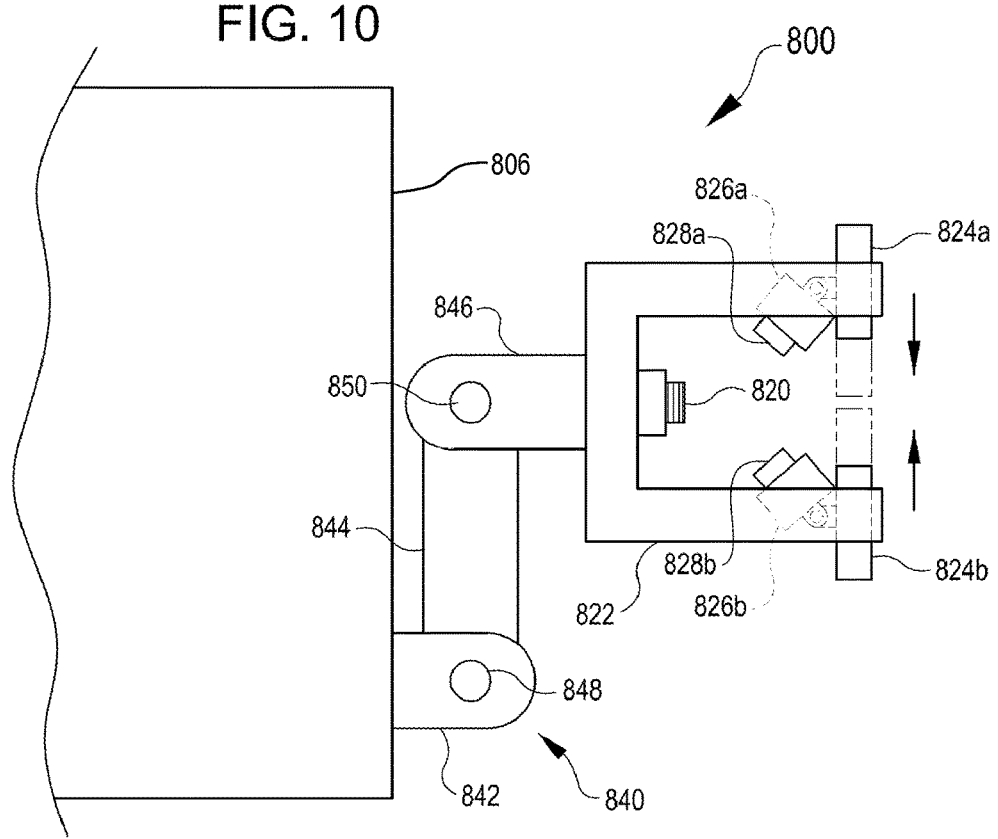
FIG. 10 shows a second embodiment of an alternative vertical element grasping mechanism, in accordance with embodiments.

FIG. 10 shows an alternative vertical element grasping mechanism 800 which can be combined with a vertically mobile drive unit similar to the drive unit 700 of FIG. 7 or the drive unit 103 shown in FIG. 1, in accordance with embodiments. The grasping mechanism 800 is shown in a top-down view. The grasping mechanism 800 includes a rigid U-shaped member 822 which is connectible with a drive unit by a mechanical arm 840. The mechanical arm 840 can be formed of multiple linkages forming an articulating assembly, e.g., first, second, and third linkages 842, 844, 846 connected together at pivotal connections 848, 850, to provide the grasping mechanism 800 with multiple degrees of freedom. In various alternative embodiments, the mechanical arm 840 can employ more, or fewer, linkages. In alternative embodiments, the mechanical arm 840 can also be arranged to extend from a cavity in a body of a drive unit (e.g., similar to cavity 718 of drive unit 700 shown in FIGS. 7-10), or can extend from a side of the drive unit body 806.

The rigid U-shaped member 822 of the grasping mechanism 700 employs a stationary contact element 820 that extends from the grasping mechanism, and movable contact elements 828*a,b* positioned on grasping elements 826*a,b*. The grasping elements 826*a,b* can move inward by, e.g. actuators 824*a,b*. According to some embodiments, the linear actuators 824*a,b*, can be pistons, gear-driven actuators, or any other suitable linear actuator. According to some embodiments, the actuators 824*a,b* can lock together when the grasping mechanism 700 is grasping a vertical element, e.g., using a mechanically interlocking mechanism or other suitable interlocking mechanism. The grasping elements 826*a,b* can be stationary with respect to the linear actuators 824*a,b* or may be pivotally connected and able to rotate in order to better align with and contact a vertical element.

Figure 11:
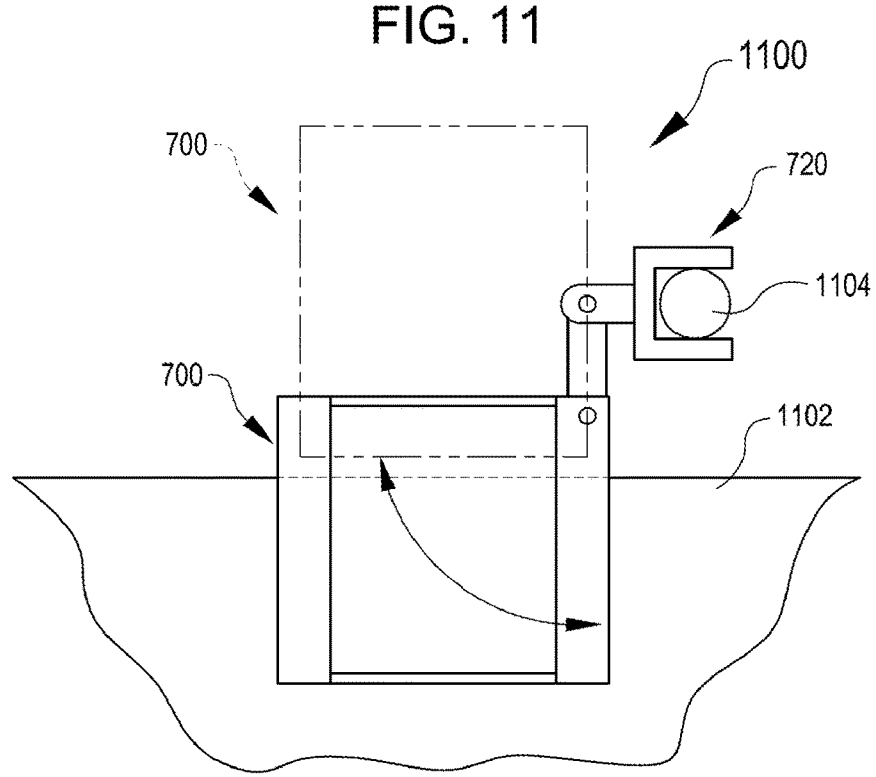
FIG. 11 illustrates a mode of moving a drive unit onto an upper level of an inventory management facility.

A grasping mechanism can be connected with a drive unit according to a variety of configurations, and able to move relative to a vertical element according to a variety of different modes. FIG. 11 is a simplified diagram showing a first mode 1100 of moving the drive unit 700 (see FIG. 7) onto an upper level 1102 of an inventory management facility, in accordance with embodiments. According to the mode 1100, drive unit 700, which partially encloses its grasping mechanism, can retain the vertical element 1104 using the grasping mechanism 720 while being oriented sidelong to or away from the upper level 1102. The drive unit 700 can then translate by rotating toward the upper level 1102 until the drive unit is substantially above the upper level, where it can proceed to disengage the grasping mechanism 720 from the vertical element 1104 and move onto the upper level.

Figure 12:
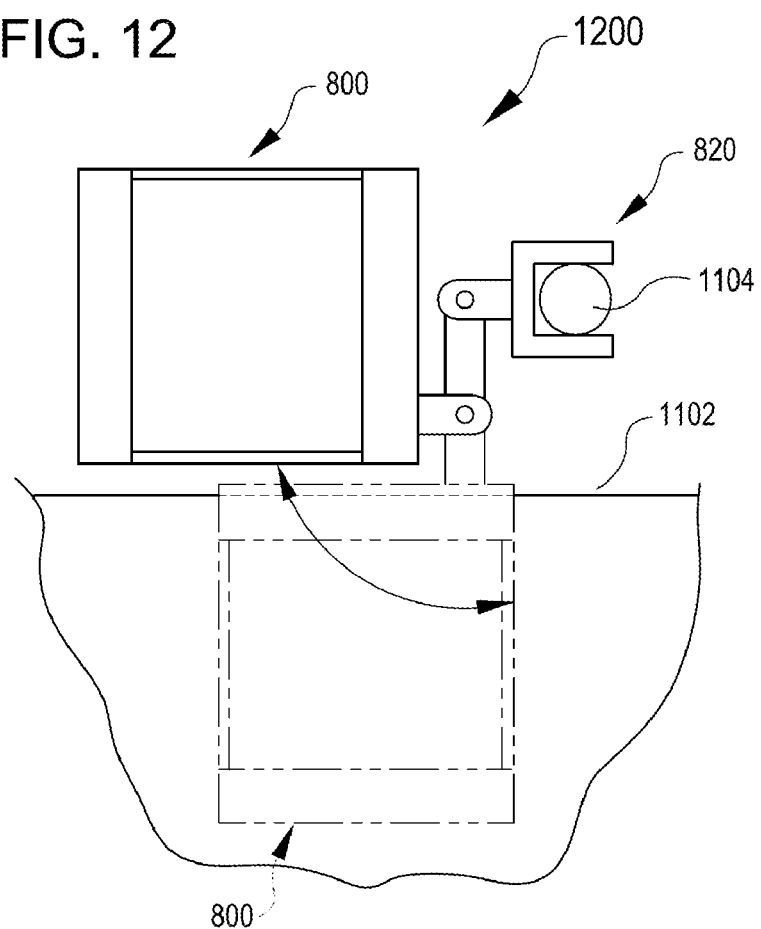
FIG. 12 illustrates a second mode of moving a drive unit onto an upper level of an inventory management facility.

FIG. 12 is a simplified diagram showing a second mode 1200 of moving a drive unit 800 (see FIG. 10) with an articulating mechanical arm onto an upper level 1102 of an inventory management facility, in accordance with embodiments. According to the second mode 1200, the drive unit 800 can retain the vertical element 1104 using the grasping mechanism 820 while the drive unit is oriented sidelong to or away from the upper level 1102. The drive unit 800 can then translate by rotating toward the upper level 1102, similar to the mode 1100 described above with reference to FIG. 11. As a point around which the drive unit 800 pivots moves farther from a center of mass of the drive unit, the drive unit can be placed farther onto the upper level 1102.

Figure 13:
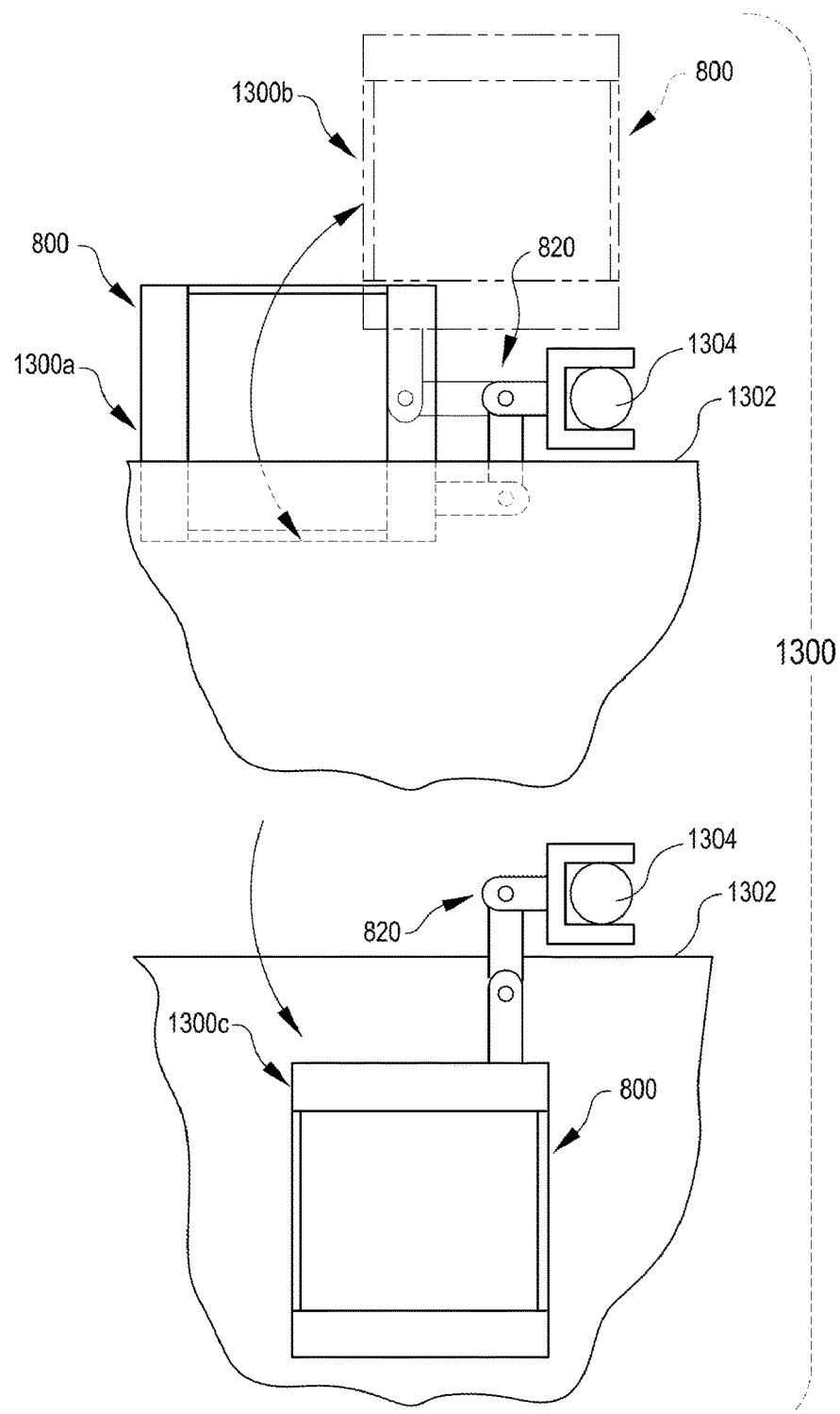
FIG. 13 illustrates a third a mode of moving a drive unit onto an upper level of an inventory management facility.

FIG. 13 illustrates a third a mode 1300 of moving a drive unit 800 (see FIG. 10) onto an upper level 1302 of an inventory management facility, in accordance with embodiments. The third mode 1300 illustrates one mechanism by which a drive unit 800 can navigate onto an upper level 1302 from an adjacent vertical element 1304 even when the vertical element and upper level 1302 are positioned very close together. According to this third mode 1300, a drive unit can ascend or descend while in a first orientation 1300*a*, in which the drive unit 800 is drawn close to the vertical element 1304 to reduce load on the grasping mechanism 820. Then, the drive unit 800 can be reoriented to a second orientation 1300*b*, which draws the drive unit away from the upper level 1302 and allows the drive unit to ascend or descend in the space immediately adjacent to the second level 1302 without causing the drive unit to collide with the second level. A third orientation 1300*c* places the drive unit 800 above the upper level 1302.

Figure 14:
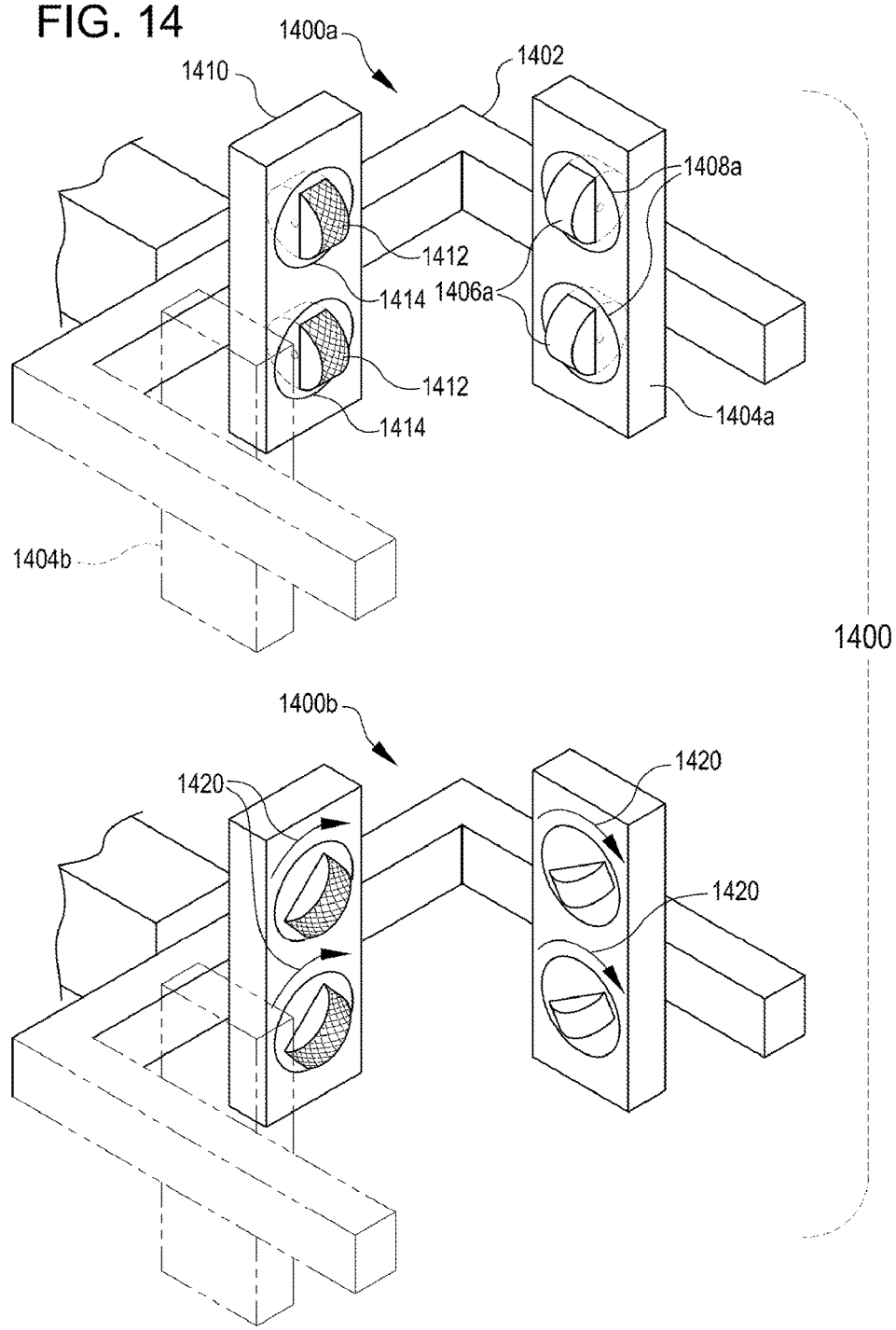
FIG. 14 illustrates a mechanism for actuating a gripping element of a vertical element grasping mechanism.

According to some embodiments, a drive unit can rotate around a vertical element without necessitating the use of a mechanical arm. For example, FIG. 14 shows a simplified perspective view of a grasping mechanism 1400 with rotating contact elements 1412, 1406*a* in drive element 1410 and gripping element 1404*a*, respectively. Drive elements 1410 and gripping element 1404*a* are shown connected with a rigid U-shaped element 1402 herein, however, it will be understood that the features described herein may also apply to grasping mechanism using movable grasping arms.

Rotating contact elements can provide for circular or helical movement around a vertical element, in accordance with embodiments. In a first configuration 1400*a*, or a vertical movement configuration, the contact elements 1412, 1406*a* are oriented vertically, so that a drive unit employing the grasping mechanism 1400 will transit vertically when the grasping mechanism 1400 is engaged with a vertical element. In a second configuration 1400*b*, or a rotational configuration, the contact elements 1412, 1406*a* have been rotated according to a predetermined arc 1420 via rotating elements 1414, 1408*a*, such that the contact elements no longer point up and down. According to some embodiments, the rotating elements 1414, 1408*a* can rotate 90 degrees such that the resulting configuration allows the grasping mechanism 1400 to instead rotate a drive unit in a circular path around a vertical element to which the drive unit has attached. Alternatively, the rotating elements 1414, 1408*a* can rotate by less than 90 degrees such that the resulting configuration allows the grasping mechanism 1400 to instead promote a helical path by a drive unit attached with a vertical element, as shown below with reference to FIG. 15.

According to some alternative embodiments, multiple sets of contact elements similar to contact elements 1412, 1406*a* may be provided, a first set being oriented vertically as shown in the first configuration 1400*a*, and a second set being oriented horizontally or at an angle, as shown in the second configuration 1400*b*. Rather than causing individual contact elements to rotate by way of a rotating element such as rotating elements 1414, 1408*a*, the alternative grasping mechanism can alternate between utilizing the first set and the second set. For example, to transition from vertical motion to horizontal or helical rotation around a vertical element, gripping elements in the second configuration 1400*b* can be brought into contact with the vertical element, followed by removal of the gripping elements in the first configuration 1400*a*.

Figure 15:
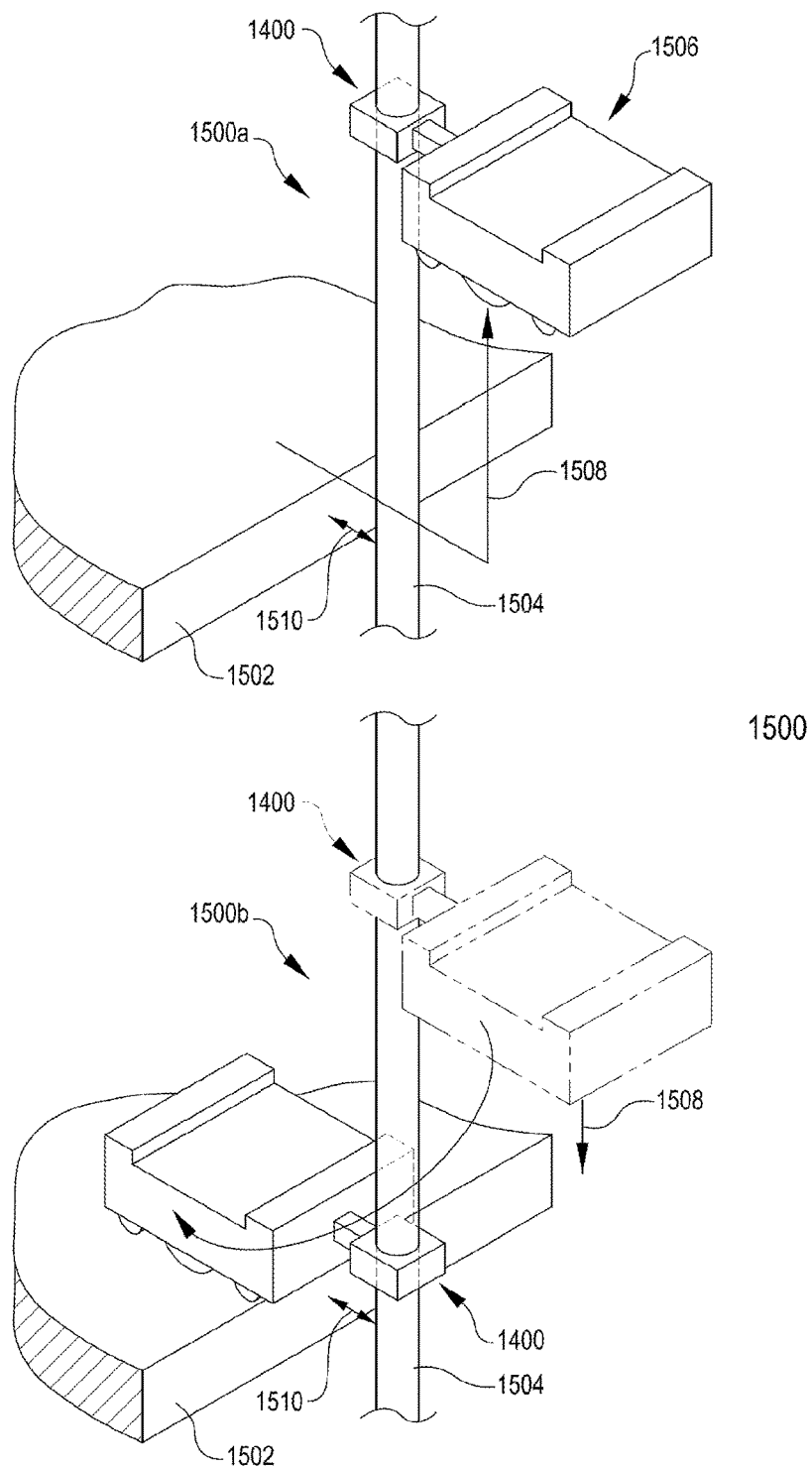
FIG. 15 illustrates a fourth mode of moving a drive unit onto an upper level of an inventory management facility.

FIG. 15 illustrates a fourth example mode 1500 of moving a drive unit 1506 onto an upper level 1502 of an inventory management facility. In this mode 1500, the drive unit 1506 is attached with a vertical element 1504 by way of a grasping mechanism 1400. In order to ascend to an upper level 1502, the drive unit 1506 can ascend beyond the second level to a height 1508 above the second level. Clearance 1510 is sufficient to allow the drive unit 1506 to clear the upper level 1502 while the drive unit is oriented away from the upper level in a first orientation 1500*a*. Once the drive unit 1506 is above the upper level 1502, the grasping mechanism 1400 can adjust to a rotational configuration 1400*b* in which the drive unit moves in a circular or helical path to rotate around the vertical element 1504 and onto the second level 1502.

Figure 16:
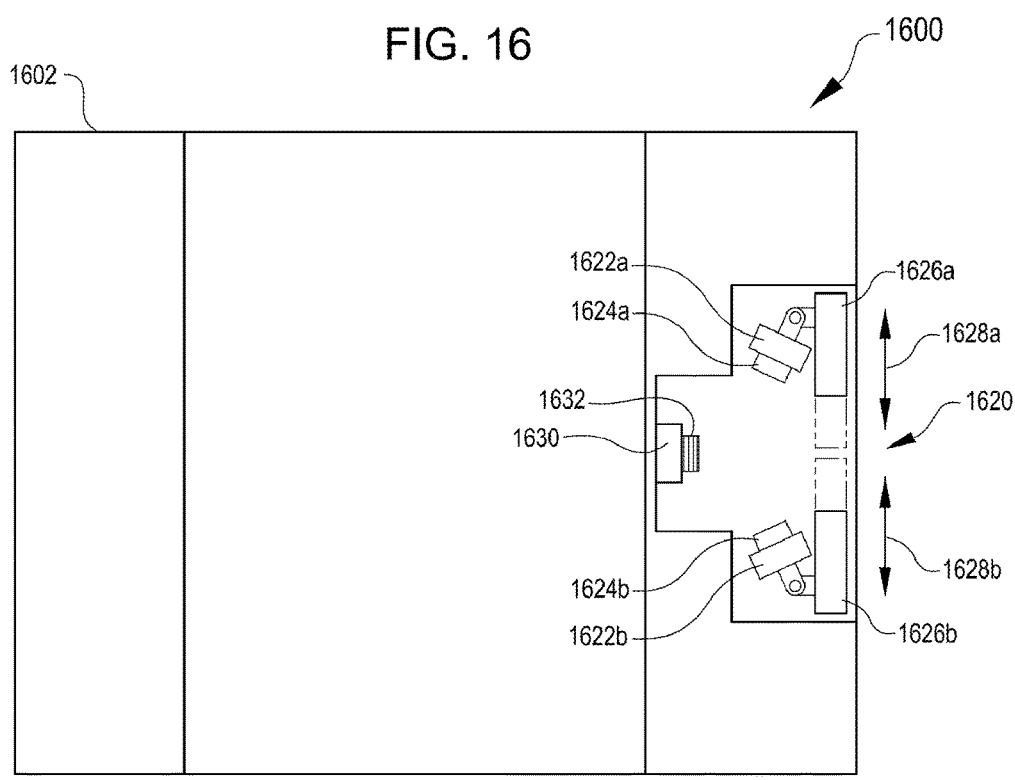
FIG. 16 shows a second drive unit with an internal vertical element grasping mechanism for implementing aspects of an inventory system, in accordance with embodiments.

Various embodiments above describe vertically mobile drive units having grasping mechanisms positioned outside a body of the drive unit. However, according to various embodiments, grasping mechanisms may be included within a drive unit body as well. For example, FIG. 16 shows a vertically mobile drive unit 1600 with an internal vertical element grasping mechanism 1620 for implementing aspects of an inventory system, in accordance with embodiments. The drive unit 1600 includes a body 1602 similar to the drive unit body 700 shown in FIG. 7, which may include similar features (e.g. a horizontal drive mechanism, a control mechanism, sensors) and an internal grasping mechanism 1620 which includes a vertical drive mechanism defined by one or more vertical drive elements 1630, where the grasping mechanism is located within the drive unit body 1602.

Features of the grasping mechanism 1620 may be similar to grasping mechanisms discussed above, including, e.g., a drive element 1630 with one or more contact elements 1632; gripping elements 1622*a,b* also employing contact elements 1624*a,b*; and actuators 1626*a,b*. The actuators 1626*a,b* can translate the gripping elements 1622*a,b* to cause the grasping mechanism 1620 to securely grip a vertical element.

Figure 17:
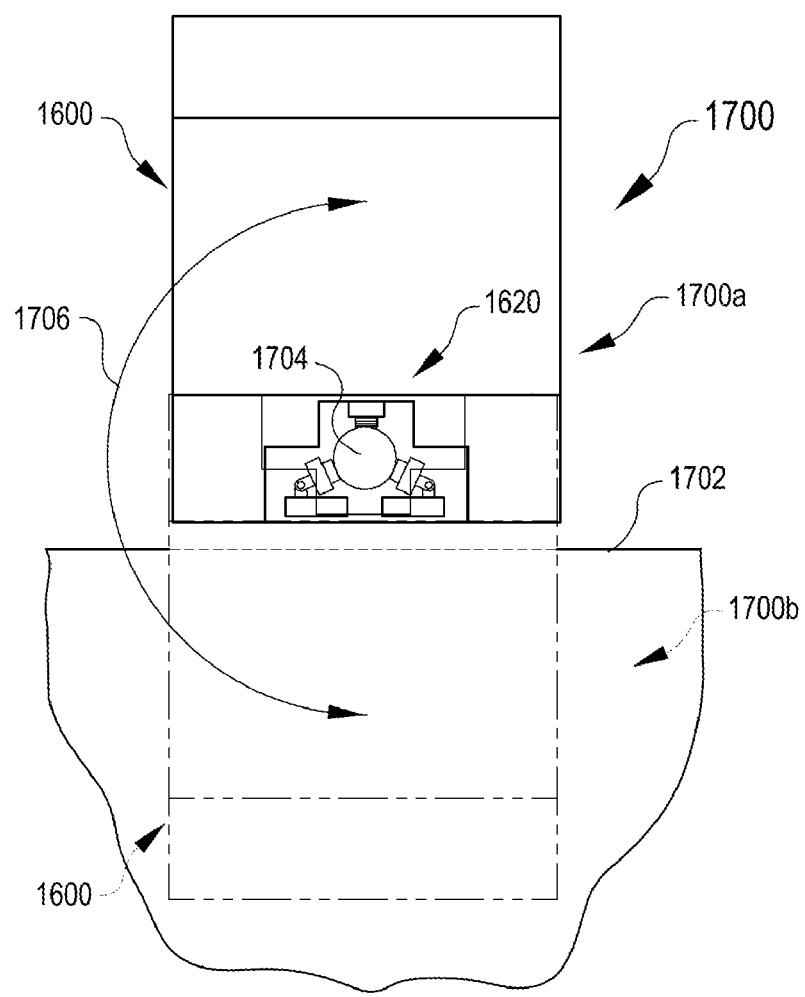
FIG. 17 shows a fifth mode of moving a drive unit onto an upper level of an inventory management facility.

For internally positioned grasping mechanisms such as grasping mechanism 1620 shown in FIG. 16, rotating mechanisms similar to those described above with reference to FIG. 14 may be employed (i.e., rotating contact elements or alternating sets of contact elements). FIG. 17 illustrates a fifth mode 1700 of moving a drive unit 1600 onto an upper level 1702 of an inventory management facility where the drive unit employs an internal grasping mechanism 1620, in accordance with embodiments. In this mode 1700, the drive unit 1600 is connected with a vertical element 1704 by the grasping mechanism 1620. In a first configuration 1700*a*, the drive unit 1600 is capable to ascending or descending the vertical element 1704 while clearing the upper level 1704. When the drive unit 1600 is above the upper level 1704, the grasping mechanism 1620 can adjust to a rotating configuration (see FIG. 14), allowing the drive unit 1600 to rotate around the vertical element 1704 until positioned in the second configuration 1700*b* above the upper level 1702.

According to some embodiments, drive units can employ aspects of both internal and mechanical-arm-based grasping elements. FIG. 18 shows a third example of a vertically mobile drive unit 1800 with an alternative internal vertical element grasping mechanism 1820, wherein the grasping mechanism is internal to an articulating portion 1804 of the drive unit body 1802. The articulating portion 1804 may be generally connected with the body 1802, but have a pivotal connection 1808 attaching the articulating portion with a protrusion 1806 of the drive unit body 1806. The drive unit 1800 can rotate around a vertical element by, e.g., causing the grasping mechanism 1820 to rotate the drive unit in a manner similar to that shown in FIG. 17.

FIG. 19 illustrates a sixth mode 1900 of moving a drive unit 1800 onto an upper level 1902 of an inventory management facility, in accordance with embodiments. The drive unit 1800 is attached with a vertical element 1904 by way of the grasping mechanism 1820. In a first configuration 1900*a*, the drive unit 1800 clears the upper level 1902, allowing it to ascend and descend the vertical element 1904 while clearing the upper level 1902. The drive unit 1800 can actuate the articulating portion 1804 away from the drive unit 1800 around the pivotal connection 1808, causing the drive unit to rotate to a second configuration 1900*b*, in which the drive unit 1800 is positioned above the second level 1902 and capable of disengaging the grasping mechanism 1820.

Embodiments of grasping mechanisms herein described generally include both vertical drive mechanisms employing contact elements and gripping elements, also including contact elements. Contact elements may include various constructions, as discussed above; and contact elements for vertical drive mechanisms and for gripping elements may be the same or may be different.

FIGS. 20-23 show various embodiments of drive mechanisms (2000, 2100, 2200, 2300), for respective vertical element grasping mechanisms in accordance with embodiments. For example, FIG. 20 shows an example of a vertical drive mechanism 2000 for use with a vertical element 2002 that includes contact elements 2006 having a gripping surface, such as rubber or a durable adhesive, which allows the contact elements to firmly grip the vertical element due to friction. The contact elements 2006 are positioned within a casing 1004 containing an actuator 2010 that is operable to turn the contact elements 2006 in order to impart force on the vertical element 2002.

FIG. 21 shows a comparable vertical drive element 2100 for use with a vertical element 2102 having a surface texture or grooved surface 2104. The vertical drive mechanism 2100 employs a first, geared or textured contact element 2108 which interacts with the surface 2104 of the vertical element 2102. Additional contact elements (e.g. contact element 2110) may or may not employ a surface texture or grooved surface as well. The contact elements 2108, 2110 are positioned within a casing 2104 containing an actuator 2010 that is operable to turn the contact element 2108 in order to impart force on the vertical element 2102. In some cases, the actuator 2010 may further include a ratcheting mechanism that interacts with the first contact element 2108 and provides for a fail-safe mechanism by, allowing the vertical drive mechanism 2100 to automatically hold position when not under power.

FIG. 22 shows a vertical drive mechanism 2200 for use with a vertical element 2202 that operates by linear induction. The vertical drive mechanism 2200 includes contact elements 2206 that contact the vertical element 2202 to control an orientation of the vertical drive mechanism with respect to the vertical element. The contact elements 2206 are partially enclosed in a casing 2206 which can also enclose a linear induction actuator 2210. In alternative embodiments, the linear induction actuator 2210 may include multiple components positioned in the vertical drive mechanism 2200 around a circumference of the vertical element 2202. The linear induction actuator 2210 is operable to impart force on the vertical element 2202 from the vertical drive mechanism 2200.

Figure 23:
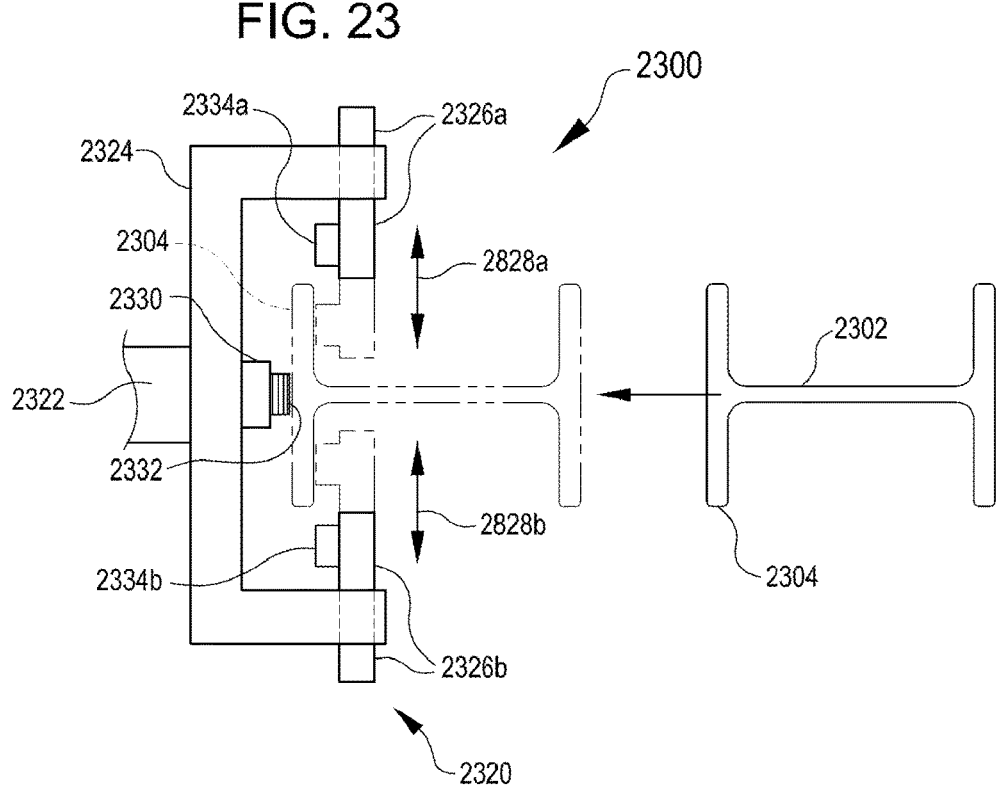

FIG. 23 shows an example of a grasping mechanism 2300 including a vertical drive mechanism 2320 for use with a vertical element 3202 having a complex shape, e.g. an I-beam. The grasping mechanism 2300 includes rigid body 2334 supporting a drive element 2330 with one or more contact elements 2332 and additional gripping/contact elements 2334a,b attached with the rigid body by actuators 2326a,b. In operation, the grasping mechanism 2300 grasps a working portion 2304 of the vertical element 3203 by encompassing the working portion and moving the contact elements 2334a,b by the actuators 2326a,b, in order to bring all contact elements 2332, 2334a,b into contact with the working portion. The grasping mechanism 2300 may connect with a drive unit via a mechanical arm 2322, or other suitable connection.

Embodiments described above include drive units capable of transiting along vertical elements to transfer resources between different floors in an inventory system. In general, embodiments above provide for apparatuses, methods, and systems for allowing such drive units to navigate between vertical elements and upper levels of multi-level inventory management facilities where the vertical elements and upper levels are stationary with respect to each other. However, according to various embodiments, drive units can transit to and from upper levels of multi-level facilities at least in part facilitated by movable panels in the inventory system.

Figure 24:
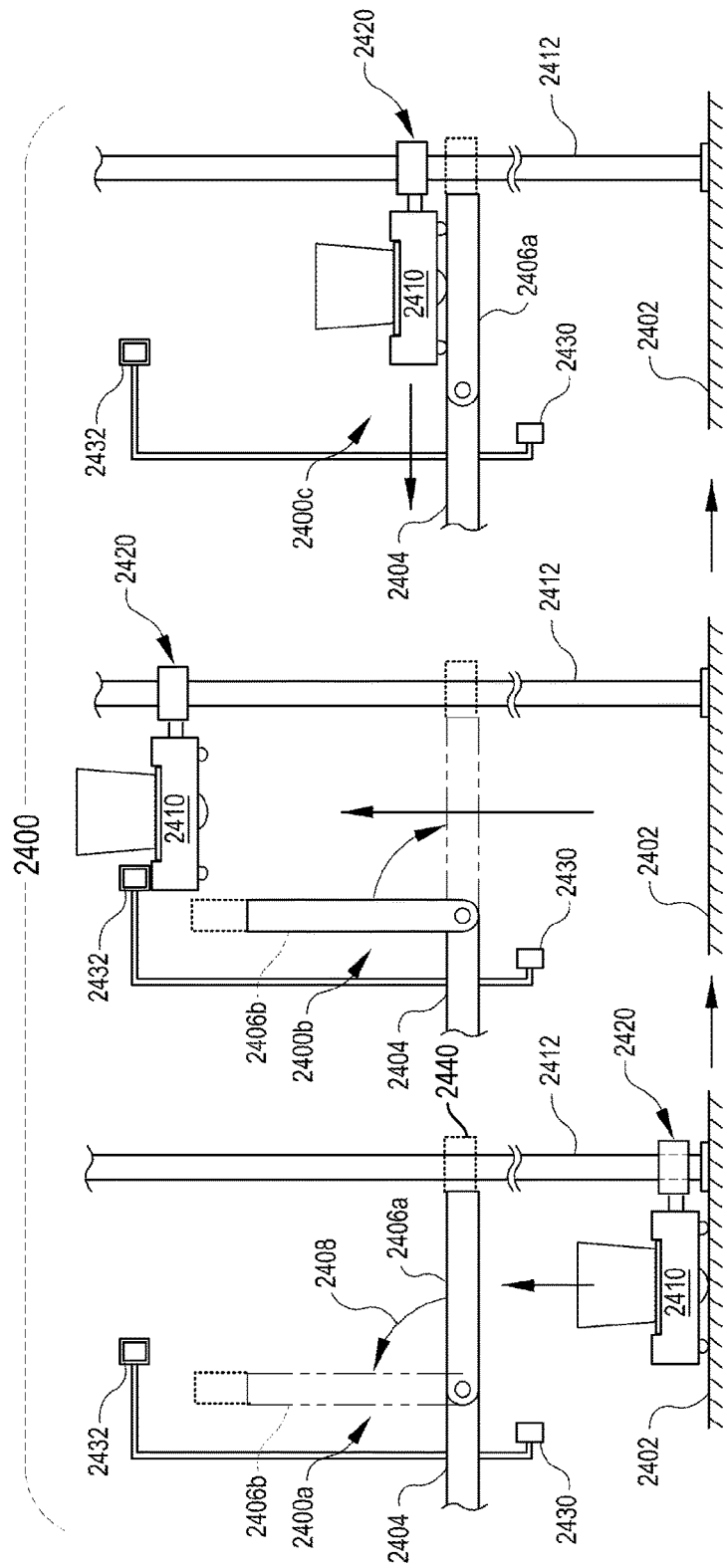
FIG. 24 illustrates an example system for controlling a drive unit to transit onto an upper level of an inventory management facility by way of a movable panel.

For example, FIG. 24 illustrates an example system 2400 for controlling a drive unit 2410 to transit onto an upper level 2404 of an inventory management facility by way of a movable panel 2406, in accordance with embodiments. In a first configuration 2400a, a drive unit 2410 can transit along a first floor 2402 to a vertical element 2412 that extends upward adjacent to a second floor 2404. As the drive unit 2410 ascends the vertical element 2412, a sensor 2430 can detect the presence of the drive unit 2410 and cause a movable panel 2406 to move from a first, closed position 2406 to a second, open position 2406b.

According to some embodiments, the movable panel 2406 is a single panel pivotally connected with the second level 2404. According to various alternative embodiments, multiple panels can take the place of the movable panel.

According to some alternative embodiments, the movable panel 2406 can include a gap or void therein 2440 that allows the movable panel to close around the vertical element 2440. In such cases, the movable panel 2406 may be positioned interior to the second level rather than at an edge of the second level.

At a second configuration 2400b, the drive unit 2410 can ascend a predetermined distance above the second level 2404 such that the drive unit clears the open movable panel 2406b. The open movable panel 2406b can then close beneath the drive unit 2410 in order to provide a platform for the drive unit as shown in the third configuration 2400c. In some embodiments, the drive unit 2410 can ascend until it triggers a second sensor 2432 that causes the open movable panel 2406b to close.

In order to descend from the second floor to the first floor, the drive unit 2410 can proceed in reverse by, e.g., by approaching and grasping the vertical element 2410 as shown in the third configuration 2400c; by ascending above the movable panel 2406 to trigger the second sensor 2432, causing the movable panel 2406 to open; and then descending through a transitable open space formed by the open panel 2406b. When the drive unit 2410 passes the first sensor 2430, the first sensor can trigger the open movable panel 2406 to close.

Figure 25:
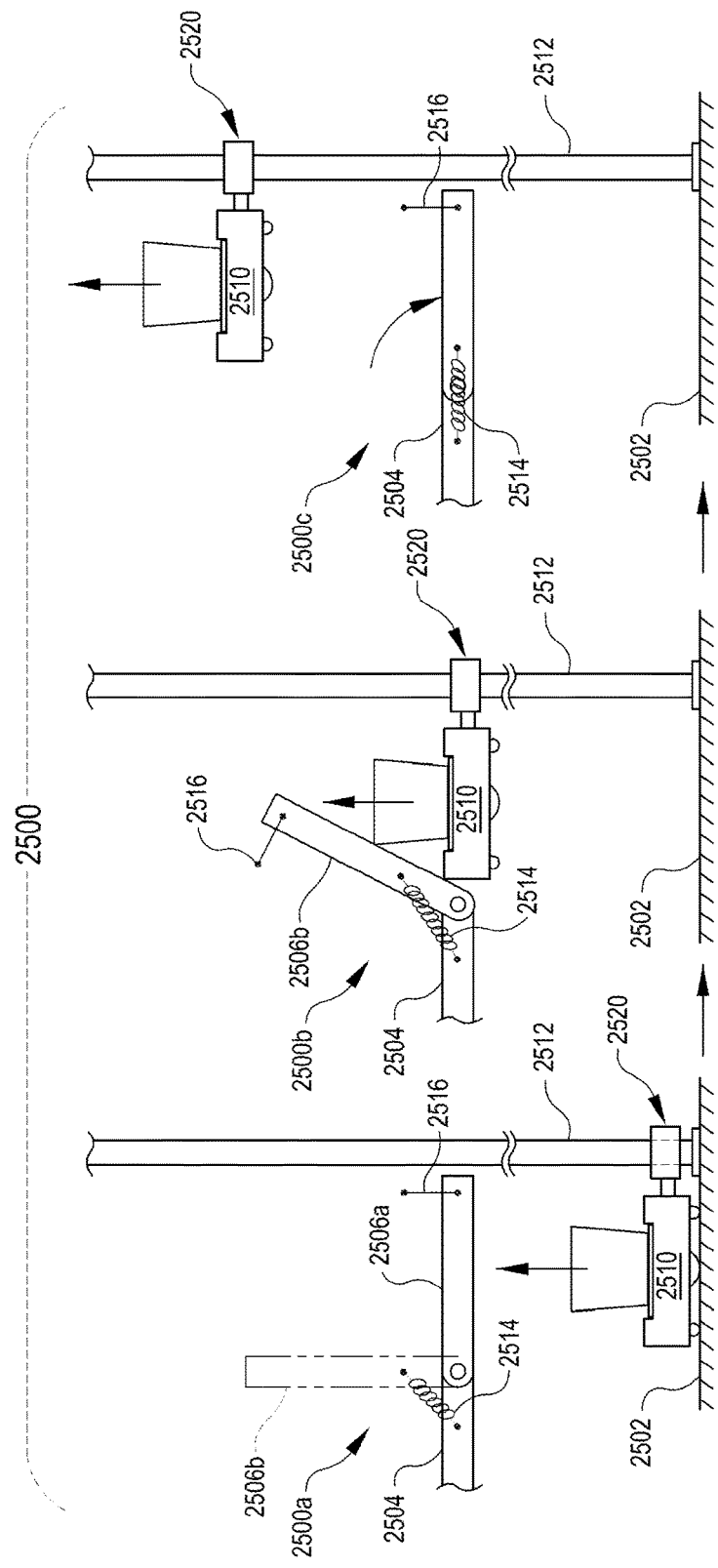
FIG. 25 illustrates a second example system for controlling a drive unit to transit onto an upper level of an inventory management facility by way of a movable panel.

According to some embodiments, a movable panel can be opened or closed using mechanical means. To that end, FIG. 25 illustrates a second example system 2500 for controlling a drive unit 2510 to transit onto an upper level 2504 of an inventory management facility by way of a movable panel 2506, in accordance with embodiments. In an initial configuration 2500a, a drive unit 2510 can transit along a first floor 2502 to grasp a vertical element 2512 by a grasping mechanism 2520. The drive unit 2510 can then ascend along the vertical element 2512 until it encounters a movable panel 2506 in a closed position 2506a.

The drive unit 2510 can then interact mechanically with the movable panel 2506 in a second configuration 2500b by mechanically displacing the movable panel. In some cases, this process may be simplified by an elastic mechanism 2514 conferring a biasing force on the movable panel 2506 which may reduce the force required to lift the movable panel. In alternative embodiments, a biasing force may be generated by an actuator, by a counterweight system, or any other suitable means. Once the drive unit 2510 has cleared the movable panel 2506, as in the third configuration 2500c, the movable panel can return to its initial, closed position 2506a.

Figure 26:
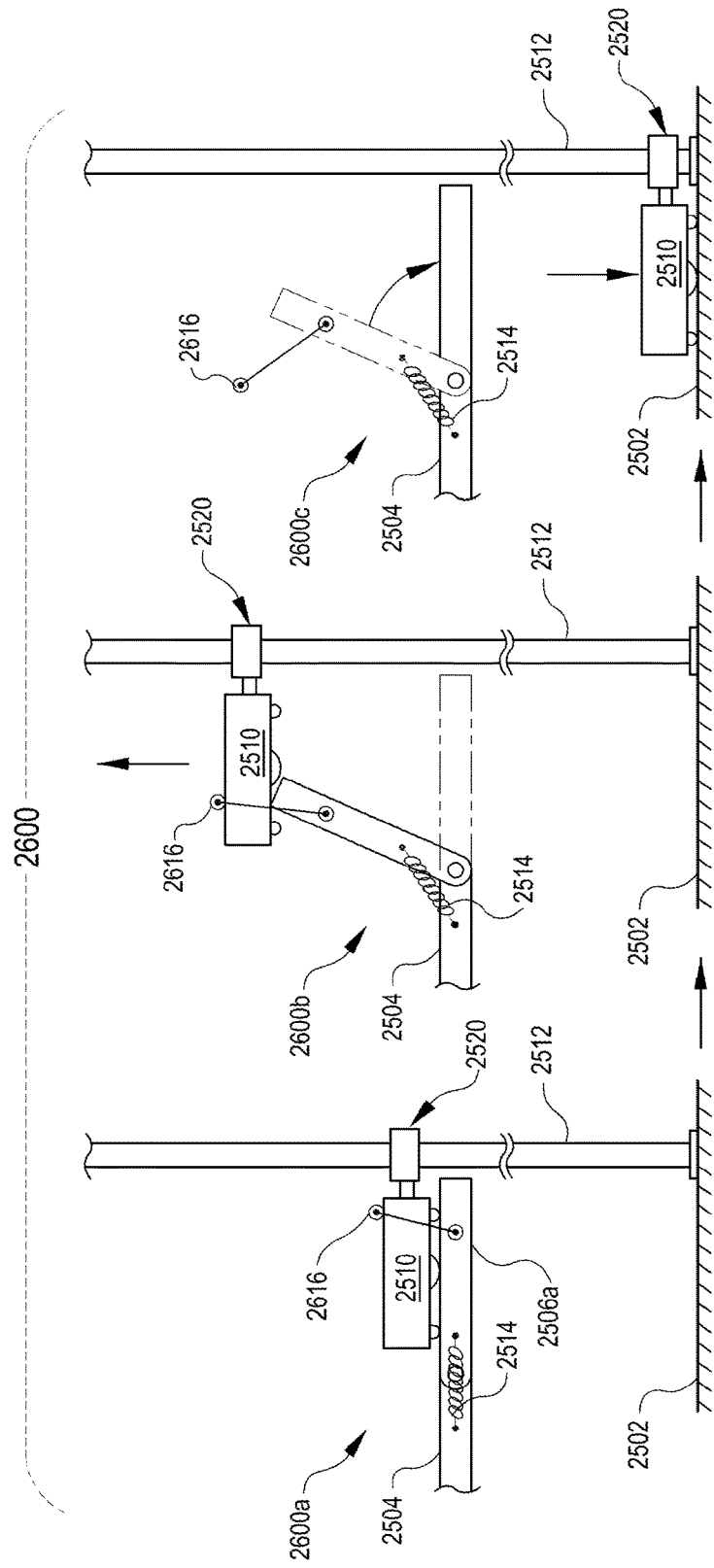
FIG. 26 illustrates an example system for controlling a drive unit to transit from an upper level to a lower level of an inventory management facility by way of a movable panel.

Comparable systems can employ a mechanical linkage (e.g., linkage 2516) to provide a mechanical means for a drive unit to actuate a movable panel in order to descend. For example, FIG. 26 illustrates an example system 2600 for controlling a drive unit to transit from an upper level 2504 to a lower level 2502 of an inventory management facility by way of a movable panel 2506, in accordance with embodiments. In a first configuration 2600a, the drive unit 2510 can approach the vertical element 2512 along the second level 2504, and then grasp the vertical element 2512 by the grasping mechanism 2520. The drive unit 2510 can also interact with the linkage 2616, such that the drive unit 2510 mechanically interferes with the linkage as it ascends along the vertical element 2512, and as shown in a second configuration 2600b. After the drive unit 2510 has cleared movable panel 2506, the drive unit 2510 can disengage from the linkage 2616 and descend past the movable panel before it closes in order to return to the lower level 2502.

Figure 27:
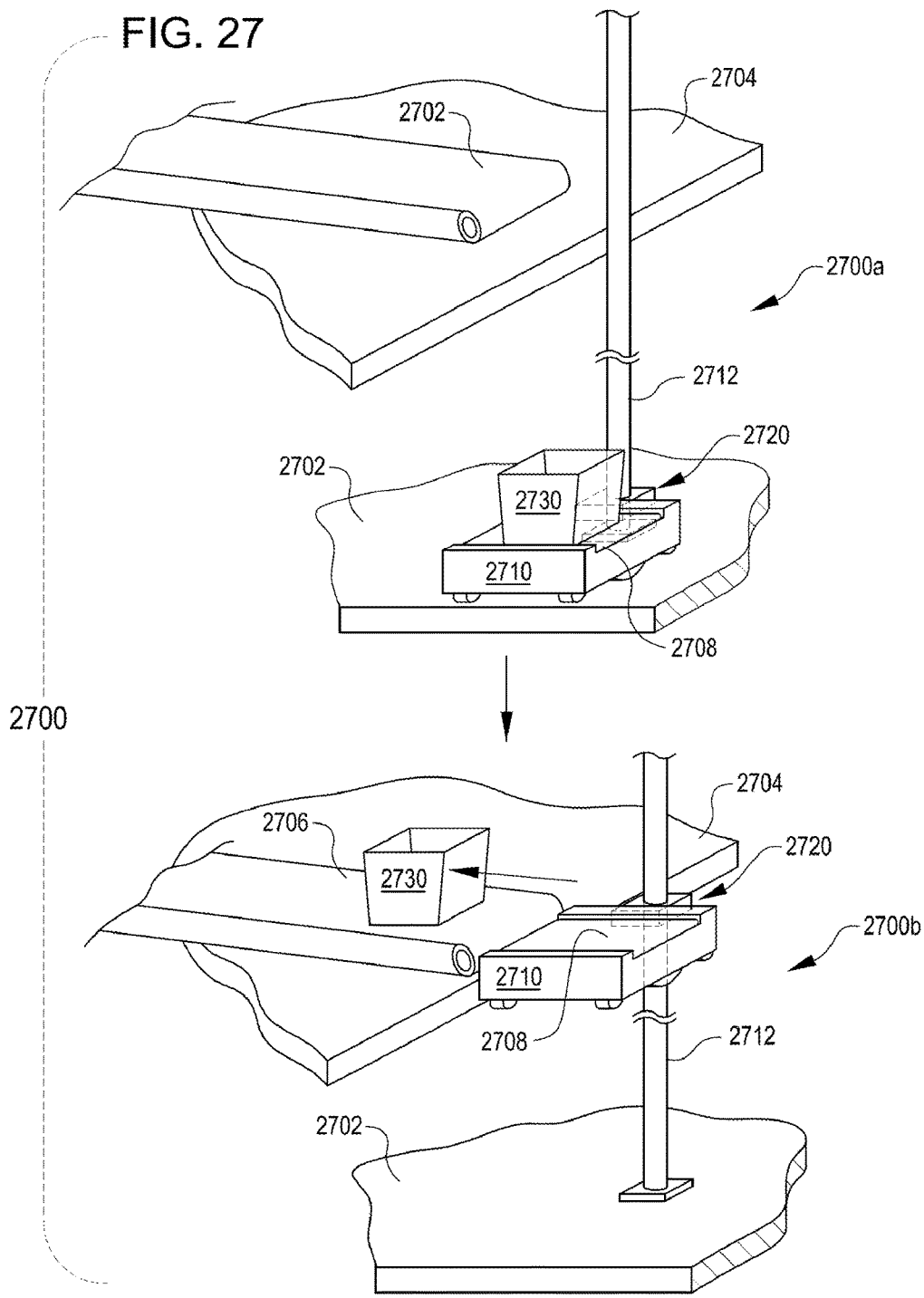
FIG. 27 illustrates an example system for controlling a drive unit to transfer a resource to an upper level of an inventory management facility.

According to some embodiments, a drive unit may not be required to disengage from a vertical element to offload a resource. FIG. 27 illustrates one such an example system 2700 for controlling a drive unit 2710 to transfer a resource 2730 to an upper level 2702 of an inventory management facility, in accordance with embodiments. In a first configuration 2700, the drive unit 2710 can transit to a vertical element 2712 and then grasp the vertical element by a grasping mechanism 2720. The drive unit includes a resource platform 2708 operable to load or unload a resource 2730. The drive unit can then ascend or descend along the vertical element 2112. As shown in a second configuration 2700b, the drive unit can ascend to a second level 2704 that includes a receiving mechanism 2702 for receiving the resource 2730. Here, the drive unit 2710 can offload the resource 2730 to the receiving mechanism 2702 without having to disengage from the vertical element 1712. The receiving mechanism 2702 can include any suitable means for receiving a resource including, but not limited to, a receiving platform, a chute, a conveyor, or the like.

Figure 28:
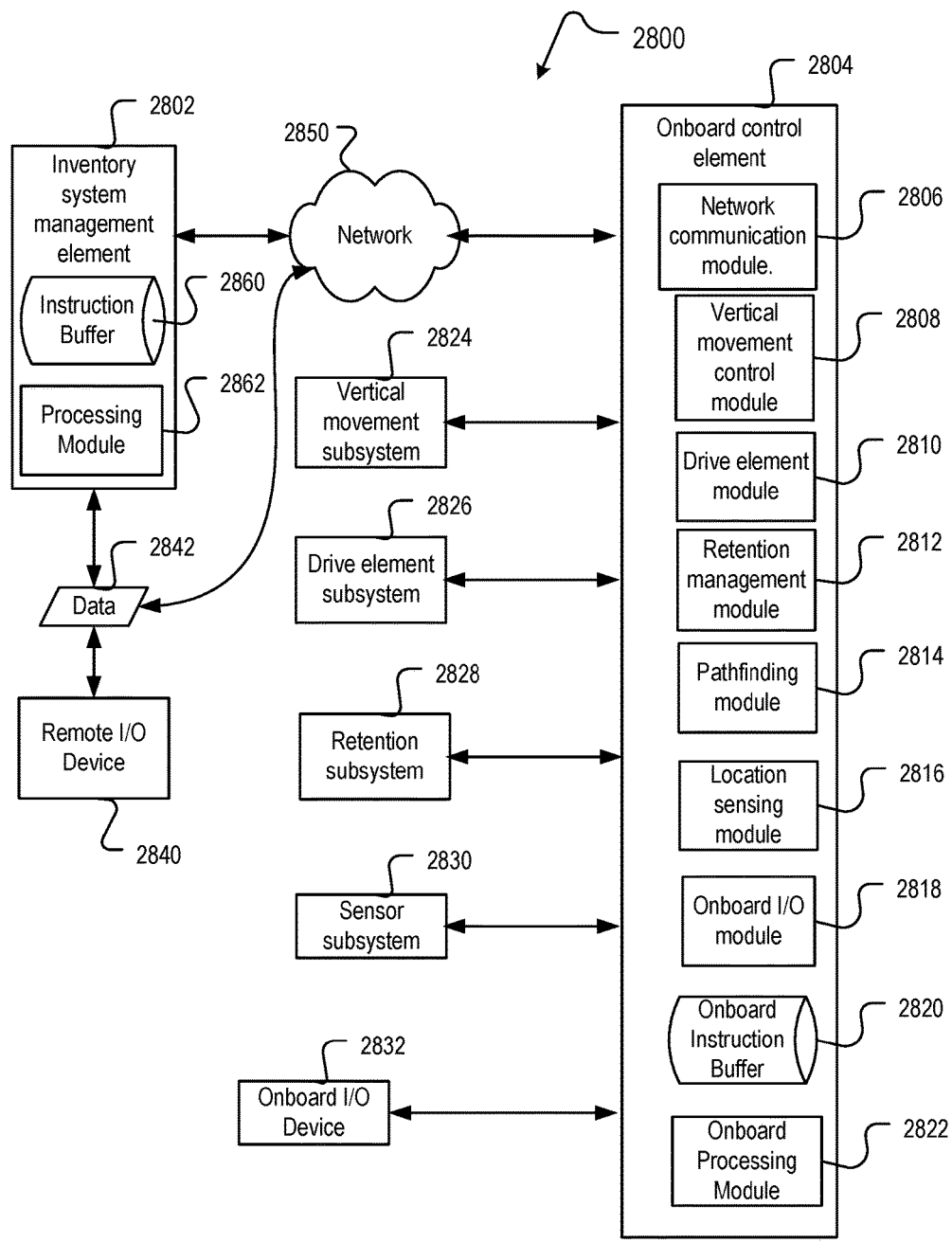
FIG. 28 illustrates an example system for controlling a drive unit with vertical element transit capability in an inventory system, in accordance with embodiments.

FIG. 28 illustrates a block diagram of an example system 2800 for controlling a drive unit with vertical element transit capability in an inventory system, in accordance with embodiments. The system 2800 may be operable to control any suitable drive unit with vertical transit capability such as drive unit 103 shown in FIG. 1, or drive units 700, 1600, or 1800 as shown in FIGS. 7-9, 16, and 18.

For example, the onboard control element 2804 can include any or all of, or any suitable combination of the following modules: a network communication module 2806, a vertical movement control module 2808, a drive element module 2810, a retention management module 2812, a pathfinding module 2814, a location sensing module 2816, an onboard data input/output (I/O) module 2818, an onboard instruction buffer 2820 which can include an onboard data storage device, and an on board processing module 2822 for enabling operation of and/or communication between any of the above modules. Any or all of said modules may be configured to enable automated or semiautonomous actions by a vertically mobile drive unit based on high-level instructions received from an inventory system management component such as the inventory system management element 109 (see also FIG. 1). The onboard control element 2804 can include a computer system configured to receive instructions via a network and cause a vertically mobile drive unit to act in accordance with those instructions. The onboard control element 2804 can be configured as a centralized component in communication with other components of the drive unit; or in alternative embodiments, the onboard control element 2804 can include parts distributed and/or collocated among one or more of the other components.

The modules making up the onboard control element 2804 can each execute instructions at corresponding components of a vertically mobile drive unit, which can include at least the following components and subsystems: a vertical movement subsystem 2824 (which can control a vertical drive mechanism), a drive element subsystem 2826 for controlling a horizontal drive mechanism, a retention subsystem 2828 for controlling a resource retention element, a sensor subsystem 2830, and an onboard I/O device 1032. The vertical movement subsystem 2824 can instruct a vertical element grasping mechanism to grasp or release a vertical element; can instruct a rotating mechanism to cause rotation of a drive unit around a vertical element; and can cause a vertical drive mechanism to engage a vertical element and exert force to ascend or descend the drive unit. The retention subsystem 2828 can instruct a retention element to retain or to release a resource and/or a detect a weight of a currently retained resource. The sensor subsystem 2830 can communicate, for example, data obtained via sensors such as images, scanned information from a visual scanner or other scanner, or any other suitable sensed information concerning the environment; and can receive instructions to use the sensor subsystem to scan particular locations or items, to adjust a direction of a sensor such as a camera, to adjust a gain of any suitable sensor, or other suitable instructions for controlling the sensor subsystem. The onboard I/O device 2832 can include, for example, a switch, keyboard, screen, touchscreen, microphone, or any other suitable device for entering a user input at the drive unit or for displaying a visual or audible output. Data can include, for example, instructions from a user to override a preexisting instruction, such as: a "stop" instruction for causing the drive unit to hold station rather than continue in a programmed path; a "shutoff" instruction for causing the drive unit to power down and land; a "soft shutoff" instruction for causing the drive unit to return to an origin location and power down; a "return to base" instruction for causing the drive unit to return to a particular location, such as a maintenance bay for troubleshooting the drive unit or an inventory station for troubleshooting an inventory management error; or any other suitable instruction. Data can also include a status message, such as: an "in transit" message; a "waiting" message; a "busy" message; any suitable error message; or any other suitable message or status identifier.

The onboard control element 2804 can send and receive network communications via a network 2850 to and/or from the inventory system management element 2802 (see also FIG. 1). The inventory system management element 2802 can include an instruction buffer 2860, which can include memory and/or a data storage device for storing executable instructions, and a processing module 2862. A remote I/O device 2840 can also send and receive remote input/output data 2842 to the inventory system management element 2802 directly, to the inventory system management element via the network 2850, and/or to the onboard control element 2804 via the network. Remote input/output data 2842 can include, for example: a data flow for remote control via a remote device; instructions to retrieve or to transport an item; or any other suitable instruction.

The inventory system management element 2802 can communicate instructions via the network 2850 to the drive unit by transmitting the instructions to the onboard control element 2804, where they can be processed by the onboard processing module 2822 and/or stored in the onboard instruction buffer 2820 for access by the onboard processing module. The instructions can be prepared at the processing module 2862 of the inventory system management element 2802, and can also be stored therein at the instruction buffer 2860. The multiple instruction buffers can enable some degree of autonomy of the drive element separate from the inventory management system element 2802: for example, instructions to retrieve a resource can be prepared at the processing module 2862 and stored in the instruction buffer 2869, and updated periodically to the onboard instruction buffer 2820; while the onboard processing module 2822 can perform the instructions stored locally at the onboard instruction buffer in the absence of overriding instructions from the inventory system management element 2802.

Figure 29:
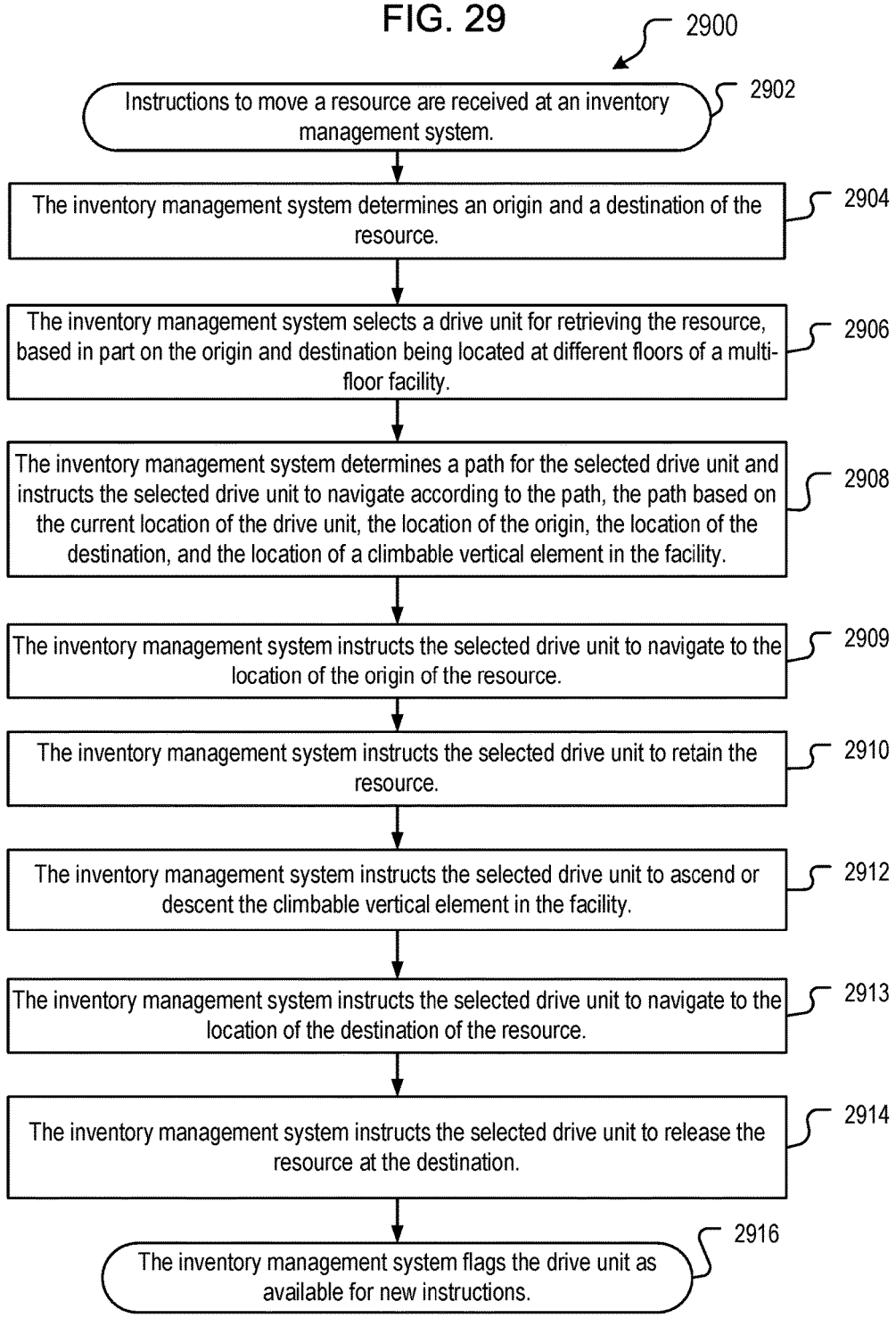
FIG. 29 illustrates an example process for controlling a drive unit to transfer a resource between a lower and upper level in an inventory system.

FIG. 29 illustrates an example process 2900 for controlling a drive unit to transfer a resource between a lower and upper level in an inventory system, in accordance with embodiments. Aspects of the process 2900 may be performed, in some embodiments, by a similar system to the system 2800 discussed with reference to FIG. 28. The system may be implemented by a vertically mobile drive unit such as those discussed in FIGS. 1, 7, 16, and 18. Some exemplary inventory systems to which this process may apply are described with reference to FIGS. 1 and 24-27.

In an embodiment, the process 2900 includes receiving instructions to move a resource at an inventory management system (act 2902). Instructions can include a location of the resource and a resource identity, e.g. a surplus of a resource such as containers, packaging material, totes; inventory items such as an individual inventory item, a container containing multiple inventory items, or an inventory holder, or comparable item. An origin and a destination of the resource are determined (act 2904). Next, the process 2900 includes selecting a vertically mobile drive unit for retrieving the resource (act 2906). The selection is based on, e.g. the origin and destination being on different floors of an inventory management facility. Other considerations for the selection may include whether the resource exceeds a weight limit for the vertically mobile drive unit, as well as availability of a drive unit; and when multiple drive units are available, proximity of an available drive unit to the origin location.

Next, the process 2900 includes the system determining a path for the selected drive unit, and instructing the selected drive unit to navigate that path (act 2908). The path is determined based on, e.g., any suitable combination of the current location of the drive unit, the origin location, the location of a nearest available transitable vertical element in the facility, and a destination location. Generally, the path is determined to avoid collisions while minimizing a distance or time of transit. The system then instructs the drive unit to proceed along the path to the origin location of the resource (act 2909) to retrieve and retain the resource (act 2910), and then to proceed to, grasp, and ascend or descend the vertical element (act 2912) toward the floor containing the destination location. The system can further instruct the drive unit to disengage from the vertical element to transit along the destination level to the destination location to the destination location (act 2913), and then release the resource at the destination location (act 2914). The system can then release the drive unit to make it available for new instructions, which may include providing the drive unit with a holding pattern, a new destination, or other instructions (act 2916).

Specific process steps for ascending or descending to a second level in an inventory management facility are provided below with reference to FIGS. 30-35. Any number of these processes may be combined with aspects of the process 2900 shown in FIG. 29. The various process steps described herein may be performed in conjunction with moving or retrieving a resource.

Figure 30:
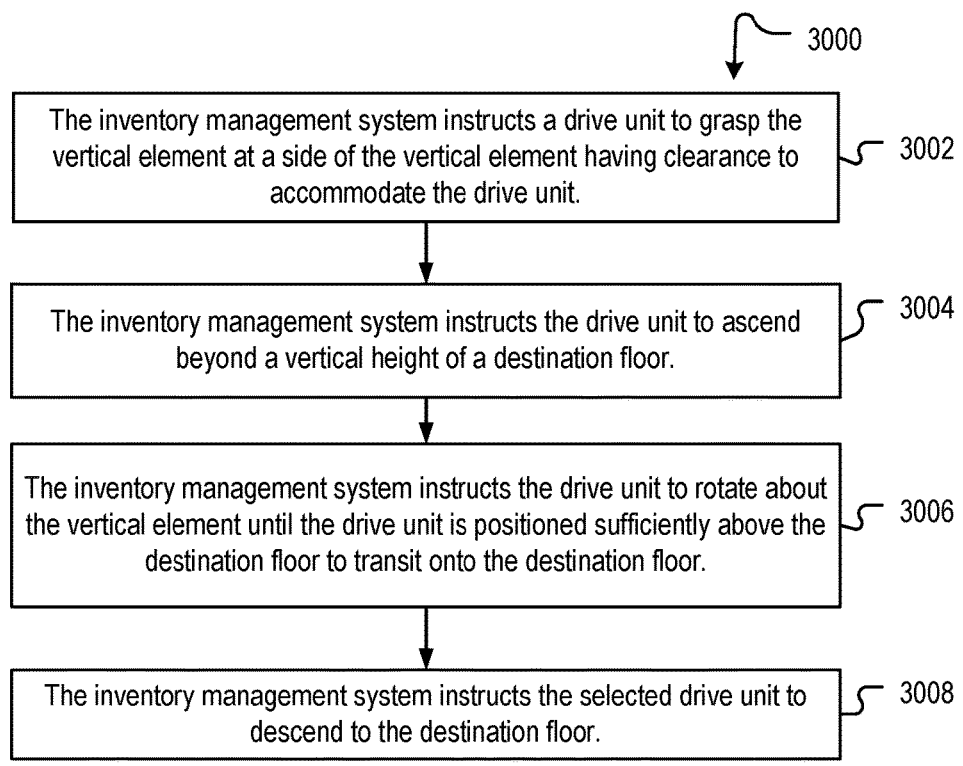
FIG. 30 illustrates a second example process for controlling a drive unit to transit between a lower and upper level in an inventory system.

FIG. 30 illustrates a second example process 3000 for controlling a drive unit to transit between a lower and upper level in an inventory system, in accordance with embodiments. Aspects of the process 3000 may be performed, in some embodiments, by a similar system to the system 2800 discussed with reference to FIG. 28. The system may be implemented by a vertically mobile drive unit such as those discussed in FIGS. 1, 7, 16, and 18. Exemplary inventory systems to which this process may apply are described with reference to FIG. 1.

In an embodiment, the process 3000 includes the system instructing a drive unit to grasp a vertical element at a side of the vertical element having clearance to accommodate the drive unit 3002. For example, where a vertical element abuts a destination floor, a drive unit thereon would typically have transit clearance on a side of the vertical element opposite the destination floor, or positioned at 90 degrees relative to the destination floor. Next, the process 3000 includes the system instructing the drive unit to ascend beyond a height of the destination floor (act 3004), and then rotating about the vertical element until the drive unit is positioned above the destination floor in suitable position to disengage from the vertical element (act 3006). The system can then instruct the drive unit to descend to the destination floor, where the drive unit can disengage from the vertical element (act 3008).

Figure 31:
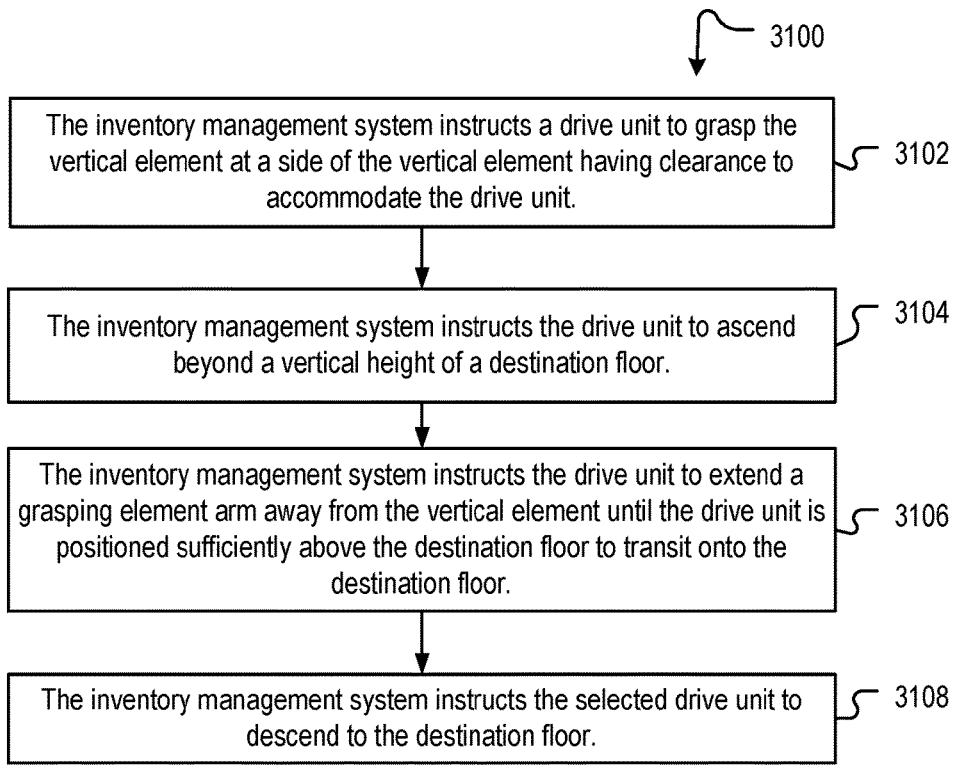
FIG. 31 illustrates a third example process for controlling a drive unit to transit between a lower and upper level in an inventory system.

FIG. 31 illustrates a third example process 3100 for controlling a drive unit to transit between a lower and upper level in an inventory system, in accordance with embodiments. Aspects of the process 3100 may be performed, in some embodiments, by a similar system to the system 2800 discussed with reference to FIG. 28. The system may be implemented by a vertically mobile drive unit such as those discussed in FIGS. 1, 7, 16, and 18. Exemplary inventory systems to which this process may apply are described with reference to FIG. 1.

In an embodiment, the process 3100 includes the system instructing a drive unit to grasp a vertical element on a side of the vertical element having clearance to accommodate the dive unit, e.g. by a grasping element connected with a body of the drive unit by a mechanical arm (act 3102). Next, the process 3100 includes the system instructing the drive unit to ascend a predetermined distance above a height of the destination floor (act 3104), and then extending the grasping element arm away from the body of the drive unit, causing the drive unit to rotate around and/or extend from the vertical element until the drive unit is above the destination floor (act 3106). The system can then instruct the drive unit to descend to the destination floor, and optionally detach the grasping mechanism from the vertical element and retract the mechanical arm when the drive unit is on the destination floor (act 3108).

Figure 32:
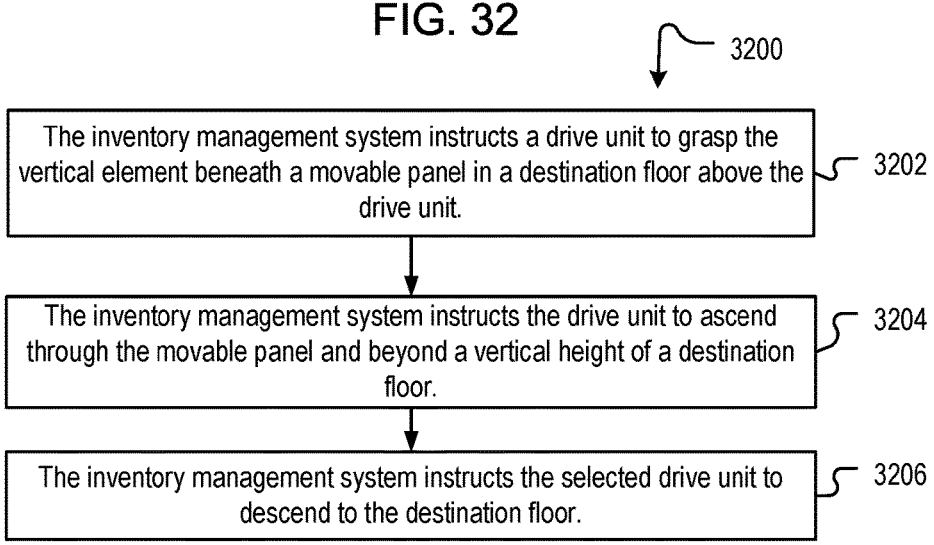
FIG. 32 illustrates an example process for controlling a drive unit to ascend to an upper level of an inventory system via a movable panel.

FIG. 32 illustrates an example process 3200 for controlling a drive unit to ascend to an upper level of an inventory system via a movable panel, in accordance with embodiments. Aspects of the process 3200 may be performed, in some embodiments, by a similar system to the system 2800 discussed with reference to FIG. 28. The system may be implemented by a vertically mobile drive unit such as those discussed in FIGS. 1, 7, 16, and 18. Exemplary inventory systems to which this process may apply are described with reference to FIG. 24.

In an embodiment, the process 3200 includes the system instructing a drive unit to grasp a vertical element beneath a movable panel in a destination floor above the drive unit (act 3202). The system can then instruct the drive unit to ascend through a transitable opening formed by the movable panel, while mechanically displacing the movable panel, and beyond a clearance height above the destination floor (act 3202). The system can then allow the movable panel to close, and further instruct the drive unit to descend to the destination floor on top of the movable panel (act 3206).

Figure 33:
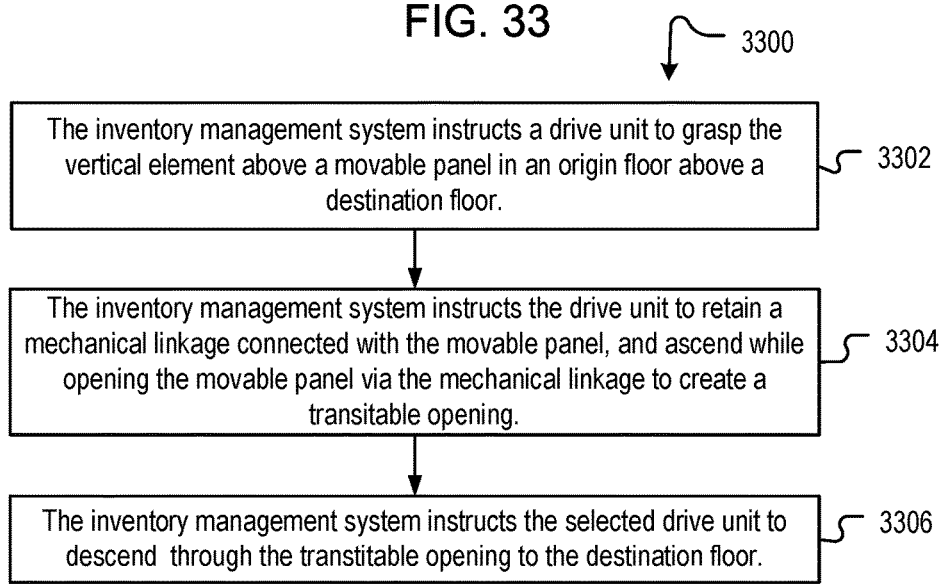
FIG. 33 illustrates an example process for controlling a drive unit to descend from an upper level of an inventory system via a movable panel.

FIG. 33 illustrates an example process 3300 for controlling a drive unit to descend from an upper level of an inventory system via a movable panel, in accordance with embodiments. Aspects of the process 3300 may be performed, in some embodiments, by a similar system to the system 2800 discussed with reference to FIG. 28. The system may be implemented by a vertically mobile drive unit such as those discussed in FIGS. 1, 7, 16, and 18. Exemplary inventory systems to which this process may apply are described with reference to FIG. 24.

In an embodiment, the process 3300 includes the system instructing the drive unit to grasp a vertical element while the drive unit is above a movable panel in an origin floor above a destination floor (act 3302). The system can then instruct the drive unit to ascend the vertical element by a predetermined distance above the origin floor, while entraining the movable panel by way of a mechanical linkage in order to open the movable panel (act 3304). Next, the process 3300 includes the system instructing the drive unit to transit through an opening formed by the open movable panel to the destination floor below (act 3306).

FIG. 34 illustrates a second example process 3400 for controlling a drive unit to ascend to an upper level of an inventory system via a movable panel, in accordance with embodiments. Aspects of the process 3400 may be performed, in some embodiments, by a similar system to the system 2800 discussed with reference to FIG. 28. The system may be implemented by a vertically mobile drive unit such as those discussed in FIGS. 1, 7, 16, and 18. Exemplary inventory systems to which this process may apply are described with reference to FIG. 25.

In an embodiment, the process 3400 includes the system instructing a drive unit to grasp a vertical element, e.g. by a grasping mechanism, while the drive unit is beneath a movable panel in a destination floor that is above the origin floor (act 3402). Next, the process 3400 includes the system instructing the drive unit to ascend the vertical element and trigger a sensor that causes the movable panel to open, creating a transitable opening in the destination floor (act 3402). The drive unit can then ascend through the opening and beyond a height of the destination floor (act 3406). In some embodiments, the system can instruct the drive unit to sense, via a sensor of the drive unit or a sensor positioned in the inventory system, a position of the destination floor (act 3407). This sensing can include, e.g., sensing an altitude or height above a lower level; sensing a distance directly using any suitable proximity sensing means including but not limited to: optical, IR, RFID, sonic, magnetic, or comparable sensing means; or detecting one or more indications by a sensor of the drive unit, such as a marked indicia on a vertical element or on the destination floor or comparable indicator. In some cases, the drive unit can detect height by sensing a distance of travel. Optionally, the drive unit can further ascend to trigger a second sensor above the movable panel that causes the movable panel to close, creating a platform that can support the drive unit. When the drive unit is positioned appropriately with respect to the destination floor, e.g. as determined in the sensing step 3407, the drive unit can be instructed by the system to descend to the destination floor (act 3408).

FIG. 35 illustrates a second example process 3500 for controlling a drive unit to descend from an upper level of an inventory system via a movable panel, in accordance with embodiments. Aspects of the process 3500 may be performed, in some embodiments, by a similar system to the system 2800 discussed with reference to FIG. 28. The system may be implemented by a vertically mobile drive unit such as those discussed in FIGS. 1, 7, 16, and 18. Exemplary inventory systems to which this process may apply are described with reference to FIG. 26.

In an embodiment, the process 3500 includes the system instructing a drive unit to grasp a vertical element, e.g. by a grasping mechanism, while the drive unit is positioned on top of a movable panel in an origin floor, the destination floor being below the origin floor (act 3502). The drive unit can then ascend the vertical element to a predetermined height, where the drive unit can trigger a sensor that causes the movable panel to open, creating a transitable opening in the origin floor below (act 3504). Next, the process includes the system instructing the drive unit to descend through the transitable opening to the destination floor below (act 3506). Various processes discussed above with respect to FIGS. 29-35 are suitable to controlling a drive unit to move between floors of an inventory system, or for moving resources between the floors of such systems. However, it will be understood that aspects of the above processes can also be employed to relocate unladen drive units for use in resource management on the different floors.

FIG. 36 illustrates an example process 3600 for controlling a drive unit to reposition the drive unit in an inventory system, in accordance with embodiments. Aspects of the process 3600 may be performed, in some embodiments, by a similar system to the system 2800 discussed with reference to FIG. 28. The system may be implemented by a vertically mobile drive unit such as those discussed in FIGS. 1, 7, 16, and 18. Exemplary inventory systems to which this process may apply are described with reference to FIG. 26.

In embodiments, the process 3600 includes the system instructing a drive unit to interact with resources on a first floor, e.g., by instructing the drive unit to retrieve, translate, and release resources on the first floor; and subsequently to relocate to a second floor in order to interact with resources on the second floor. For example, the system can receive first instructions to move a first resource on a first floor of an inventory system (act 3602). In this manner, the system can select a drive unit with vertical mobility based in part on the location of the first resource, the location of the drive unit, and the availability of the drive unit (act 3604). The drive unit is then used to move the resource, in similar manner to any suitable drive unit with a horizontal drive element, such as the drive units described above with respect to FIGS. 2-5, including for such tasks as retrieving, translating, and releasing heavy payloads like inventory holders, or for moving any other resource in the inventory system (act 3606).

Next, the system can receive further instructions (or second instructions) to move a second resource on the second floor of the inventory facility (act 3608). Alternatively, the second instructions can include instructions to relocate a drive unit to the second floor of the inventory facility from a different floor, e.g. in response to detecting a demand for additional drive units on the second floor, in response to detecting that a drive unit has left the second floor, or in response to a predicted future need for additional drive units. The system can select the drive unit for relocation to the second floor based on any of the above factors, and/or based on the availability of the drive unit, the degree of demand for additional drive units, the proximity of the drive unit to a suitable vertical element for use in relocating to the second floor, or similar factor. The system then instructs the selected drive unit to navigate to a suitable vertical element and to ascend or descent to the second floor from the first floor (act 3612). Suitable methods for the ascent/descent and navigation to and from the vertical element are discussed above with respect to FIGS. 29-35.

Once on the second floor, the drive unit may be used immediately to interact with resources on the second floor, or the drive unit may be held in reserve pending new instructions. When the drive unit is needed immediately, the system can instruct the selected drive unit to navigate to the location of the second resource on the second floor (act 3614) and then move the second resource from a third location to a fourth location on the second floor (act 3616). In some cases, aspects of this process 3600 may be combined with aspects of the processes previously discussed with respect to FIGS. 39-35. For example, in some cases, the second resource may be moved to a different floor from the second floor. Finally, the system can flag the drive unit as available for new instructions (act 3618). In some cases, flagging the drive unit can include instructing the drive unit to assume a waiting pattern, e.g. by moving to a waiting area, by returning the first floor, or by relocating to a different floor with a greater demand for drive units.

Figure 37:
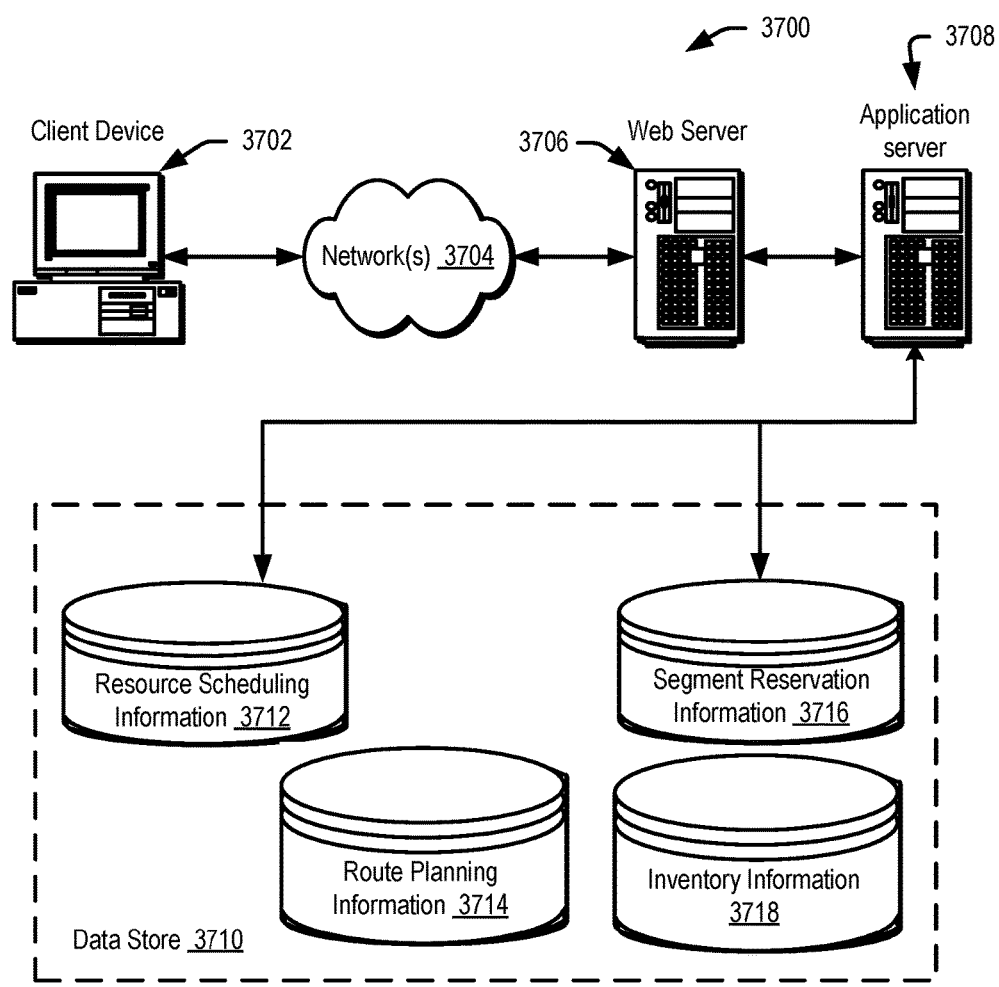
FIG. 37 illustrates an environment in which various features of the inventory system can be implemented, in accordance with at least one embodiment.

FIG. 37 illustrates aspects of an example environment 3700 for implementing aspects in accordance with various embodiments. As will be appreciated, although a Web-based environment is used for purposes of explanation, different environments may be used, as appropriate, to implement various embodiments. The environment includes an electronic client device 3702, which can include any appropriate device operable to send and receive requests, messages, or information over an appropriate network 3704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 3706 for receiving requests and serving content in response thereto, although for other networks an alternative device serving a similar purpose could be used as would be apparent to one of ordinary skill in the art.

The illustrative environment includes at least one application server 3708 and a data store 3710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 3702 and the application server 3708, can be handled by the Web server. It should be understood that the Web and application servers are not required and are merely example components, as structured code discussed herein can be executed on any appropriate device or host machine as discussed elsewhere herein.

The data store 3710 can include several separate data tables, databases or other data storage mechanisms and media for storing data relating to a particular aspect. For example, the data store illustrated includes mechanisms for storing information which can be used by modules described herein, such as resource scheduling information 3712, route planning information 3714, segment reservation information 3716, and/or inventory information 3718. It should be understood that there can be many other aspects that may need to be stored in the data store, such as for page image information and to access right information, which can be stored in any of the above listed mechanisms as appropriate or in additional mechanisms in the data store 3710. The data store 3710 is operable, through logic associated therewith, to receive instructions from the application server 3708 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 37. Thus, the depiction of the system 3700 in FIG. 37 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system, comprising:
   an inventory system comprising:
      a first level;
      a second level above the first level;
      a vertical element extending upward from the first level and passing through or adjacent to the second level; and
      a movable panel in the second level proximate to the vertical element, the movable panel defining a transitable opening when the movable panel is in an open position;
   a drive unit comprising:
      a body;
      a horizontal drive mechanism connected with the body;
      a vertical element grasping mechanism connected with the body; and
      a vertical drive mechanism connected with the vertical element grasping mechanism; and
   a management component configured with executable instructions, in order to, at least;
      receive information relating to a resource in the inventory system;
      instruct the drive unit to retrieve the resource at a first location using the horizontal drive mechanism;
      instruct the drive unit to grasp the vertical element using the vertical element grasping mechanism;
      instruct the drive unit to ascend or descend the vertical element using the vertical drive mechanism and pass through the transitable opening defined by the movable panel; and
      instruct the drive unit to move the resource to a second location on the second floor using the horizontal drive mechanism.

2. The inventory management system of claim 1, wherein the drive unit mechanically interacts with the movable panel to displace the movable panel to the open position when the drive unit passes through the transitable opening.

3. The inventory management system of claim 1, further comprising:
   at least one sensor associated with the movable panel;
   wherein the management component is further configured to:
      detect that the drive unit is ascending or descending the vertical element by the at least one sensor; and
      instruct an actuator connected with the movable panel to actuate to open the movable panel in response to the detecting.

4. The inventory management system of claim 1, wherein the movable panel comprises a hinged platform attached with a side of the second level adjacent to the vertical element, the movable panel being operable to fold upward to form the transitable opening.

5. A computer-implemented method of managing a resource, the method comprising:
   selecting a drive unit from a plurality of drive units, each drive unit comprising a body, a horizontal drive mechanism connected with the body, a vertical element grasping mechanism connected with the body; and a vertical drive mechanism connected with the vertical element grasping mechanism;
   instructing the drive unit to transit a first level of a multi-level facility to a vertical element using the horizontal drive mechanism;
   instructing the drive unit to engage with the vertical element via the vertical element grasping mechanism;
   instructing the drive unit to ascend or descend, using the vertical drive mechanism, to a second level in a multi-level facility through a transitable opening defined by a movable panel in the first or second level of the multi-level facility, the movable panel defining the transitable opening when in an open position; and
   instructing the drive unit to detach from the vertical element at the second level.

6. The computer-implemented method of claim 5, wherein:
   the second level is above the first level; and
   wherein the drive unit causes the movable panel to open by mechanically interfering with the movable panel as the drive unit ascends through the transitable opening.

7. The computer-implemented method of claim 5, wherein the second level is above the first level, and comprising:
   causing an actuator connected with the movable panel to close the movable panel after the drive unit has ascended through the transitable opening such that the movable panel is aligned with the second level; and
   instructing the drive unit to disengage the vertical element grasping mechanism from the vertical element when the body of the drive unit is on top of the movable panel.

8. The computer-implemented method of claim 7, wherein:
   causing the actuator to close the movable panel further comprises:
      detecting, via a sensor, a position of the drive unit; and
      instructing the actuator to close the movable panel when the sensor senses that the drive unit is clear of the movable panel.

9. The computer-implemented method of claim 5, wherein:
   the second level is below the first level, and comprising:
      instructing the drive unit to ascend, using the vertical drive mechanism, along the vertical element above the movable panel by a predetermined distance above the movable panel;
      detecting, via a sensor, a position of the drive unit; and
      causing an actuator to open the movable panel when the sensor senses that the drive unit is clear of the movable panel.

10. The computer-implemented method of claim 5, wherein:
    the second level is below the first level, and comprising:
       instructing the drive unit to ascend along the vertical element, using the vertical drive mechanism, above the movable panel by a predetermined distance; and
       instructing the drive unit to open the movable panel by interfering with a mechanical linkage connected with the movable panel as the drive unit ascends.

11. The computer-implemented method of claim 5, further comprising instructing an actuator connected with the movable panel to actuate in order to open the movable panel when the drive unit is ascending the vertical element.

12. The computer-implemented method of claim 5, further comprising:
   receiving information identifying a resource to be retrieved;
   instructing the drive unit to retrieve the resource on the first level of the multi-level facility using the horizontal drive mechanism; and
   instructing the drive unit to move the resource to a destination on the second level via the horizontal drive mechanism.

13. A vertically mobile drive unit, comprising:
   a drive unit comprising:
     a body;
     a horizontal drive mechanism connected with the body;
     a vertical element grasping mechanism connected with the body and operable to grasp a vertical element in an inventory system; and
     a vertical drive mechanism connected with the vertical element grasping mechanism and operable to cause the drive unit to ascend or descend the vertical element between a first level and second level of the inventory system; and
   a management component configured with executable instructions, in order to, at least:
     instruct the drive unit to transit horizontally via the horizontal drive mechanism;
     instruct the drive unit to grasp the vertical element via the vertical element grasping mechanism; and
     instruct the drive unit to ascend or descend the vertical element via the vertical drive unit, through a transitable opening defined by a movable panel in the first or second level of the inventory system.

14. The vertically mobile drive unit of claim 13, wherein executing the instructions that instruct the drive unit to ascend or descend the vertical element via the vertical drive unit through the transitable opening defined by the movable panel causes the drive unit to open the movable panel by mechanically interfering with the movable panel as the drive unit ascends or descends.

15. The vertically mobile drive unit of claim 13, wherein:
   the second level comprises a void in the second level at a side of the second level adjacent to the vertical element; and
   the management component is further configured with executable instructions, in order to:
     cause an actuator connected with the movable panel to close the movable panel such that the movable panel can support the drive unit while the drive unit is grasping the vertical element by the vertical element grasping mechanism.

16. The vertically mobile drive unit of claim 13, wherein:
   the second level comprises a void;
   the vertical element passes through the void;
   the movable panel is positioned in the void such that, when the movable panel is in the closed position, the vertical element passes through a gap in the movable panel; and
   the management component is further configured to instruct an actuator connected with the movable panel to open or close the movable panel in response to the drive unit ascending or descending the vertical element.

17. The vertically mobile drive unit of claim 13, wherein the second level is above the first level,
   wherein the drive unit further comprises a first sensor positioned below the second level configured to detect a position of the drive unit, and
   wherein the management component is configured to instruct an actuator connected with the movable panel to open the movable panel when the first sensor detects the drive unit below the movable panel.

18. The vertically mobile drive unit of claim 17, further comprising:
   a second sensor positioned above the second level configured to detect the position of the drive unit; and
   wherein the management component is configured to instruct the actuator to close the movable panel when the second sensor detects the drive unit above the movable panel.

19. The vertically mobile drive unit of claim 13, wherein the management component is further configured to instruct the drive unit to mechanically engage with a portion of the movable panel to cause the movable panel to move from the closed position to the open position.

20. The vertically mobile drive unit of claim 19, wherein the movable panel further comprises an elastic element that reduces a force required to open the movable panel.

21. The vertically mobile drive unit of claim 13, wherein the second level is below the first level;
   the movable panel comprises a mechanical linkage configured to interact with the drive unit; and
   the management component is further configured to:
     instruct the drive unit to ascend above the movable panel by a predetermined distance while mechanically interacting with the mechanical linkage to open the movable panel; and
     instruct the drive unit to disengage from the mechanical linkage.

22. The vertically mobile drive unit of claim 13, wherein the management component is further configured to:
   receive a request to open a movable panel; and
   cause an actuator connected with the movable panel to actuate in response to receiving the request.

23. The vertically mobile drive unit of claim 22, wherein the drive unit further comprises a sensor operable to sense an environment of the drive unit; and wherein the management component is further configured to:
   detect, by the sensor, that the movable panel is closed; and
   generate the request to open the movable panel in response to detecting that the movable panel is closed.

* * * * *